(12) United States Patent
Smith

(10) Patent No.: US 9,374,993 B2
(45) Date of Patent: Jun. 28, 2016

(54) MOUSE TRAP WITH GUILLOTINE KILLING MECHANISM

(71) Applicant: Woodstream Corporation, Lititz, PA (US)

(72) Inventor: Matthew A. Smith, Mansfield, OH (US)

(73) Assignee: WOODSTREAM CORPORATION, Lititz, PA (US)

( * ) Notice: Subject to any disclaimer, the term of this patent is extended or adjusted under 35 U.S.C. 154(b) by 275 days.

(21) Appl. No.: 13/944,172

(22) Filed: Jul. 17, 2013

(65) Prior Publication Data

US 2014/0020278 A1    Jan. 23, 2014

Related U.S. Application Data

(60) Provisional application No. 61/672,870, filed on Jul. 18, 2012.

(51) Int. Cl.
| | |
|---|---|
| *A01M 23/36* | (2006.01) |
| *A01M 23/24* | (2006.01) |
| *A01M 23/20* | (2006.01) |
| *A01M 23/16* | (2006.01) |
| *A01M 27/00* | (2006.01) |

(52) U.S. Cl.
CPC .............. *A01M 23/36* (2013.01); *A01M 23/16* (2013.01); *A01M 23/20* (2013.01); *A01M 23/24* (2013.01); *A01M 27/00* (2013.01)

(58) Field of Classification Search
CPC ..... A01M 23/16; A01M 23/18; A01M 23/20; A01M 23/24; A01M 23/36
USPC ........................................... 43/77–80, 60, 61
See application file for complete search history.

(56) References Cited

U.S. PATENT DOCUMENTS

| 365,763 | A | * | 6/1887 | Swan | A01M 23/36 43/61 |
|---|---|---|---|---|---|
| 432,139 | A | * | 7/1890 | Kerns | A01M 23/24 43/78 |
| 1,641,062 | A | * | 8/1927 | Bacon | A01M 23/00 43/78 |
| 2,023,427 | A | * | 12/1935 | Laughlin | A01M 23/18 43/61 |
| 2,161,789 | A | * | 6/1939 | Wingfield | A01M 23/18 43/61 |
| 2,391,640 | A | * | 12/1945 | Nemec | A01M 23/20 43/61 |
| 2,446,168 | A | * | 8/1948 | Bricker | A01M 23/14 43/61 |
| 2,529,589 | A | * | 11/1950 | Biery | A01M 23/18 43/61 |
| 2,587,349 | A | * | 2/1952 | Mace | A01M 23/18 43/67 |
| 2,669,056 | A | * | 2/1954 | Lehman | A01M 23/20 43/79 |

(Continued)

FOREIGN PATENT DOCUMENTS

| DE | EP 1400172 A1 * | 3/2004 | ............ A01M 23/24 |
|---|---|---|---|
| DE | 102007037275 A1 * | 2/2009 | ............ A01M 23/20 |

(Continued)

*Primary Examiner* — Darren W Ark
(74) *Attorney, Agent, or Firm* — Jacobson Holman, PLLC.

(57) ABSTRACT

A mouse trap having a guillotine killing mechanism is provided. The trap includes a housing with a door, a guillotine positioned to extend at least partly into an interior of said housing, a trigger mechanism including a lever and catch to hold the guillotine in a raised position to set the trap, and a spring for biasing the guillotine to a lowered killing position when the trigger mechanism is activated to release the guillotine from the raised position.

15 Claims, 22 Drawing Sheets

(56) References Cited

U.S. PATENT DOCUMENTS

| | | | | |
|---|---|---|---|---|
| 2,774,175 A * | 12/1956 | Maddocks | ............ | A01M 23/18 43/61 |
| 2,793,464 A * | 5/1957 | Bird | ............ | A01M 23/02 43/61 |
| 2,803,918 A * | 8/1957 | Hall | ............ | A01M 23/22 43/61 |
| 2,869,280 A * | 1/1959 | Dobratz | ............ | A01M 23/08 43/77 |
| 4,187,634 A * | 2/1980 | Kintz | ............ | A01M 23/20 43/61 |
| 4,310,984 A * | 1/1982 | Brubaker, Jr. | ............ | A01M 23/20 43/61 |
| 4,578,893 A * | 4/1986 | Wickenberg | ............ | A01M 23/30 43/77 |
| 4,583,317 A * | 4/1986 | Beard | ............ | A01M 23/20 43/61 |
| 4,766,692 A * | 8/1988 | Shurden | ............ | A01M 23/20 43/61 |
| 4,768,305 A | 9/1988 | Sackett | | |
| 5,005,312 A | 4/1991 | Lutes | | |
| 5,123,200 A * | 6/1992 | Vance | ............ | A01M 23/24 43/61 |
| 5,501,031 A * | 3/1996 | Heilesen | ............ | A01M 23/20 43/61 |
| 5,720,125 A * | 2/1998 | Oviatt | ............ | A01M 23/04 43/61 |
| 5,943,813 A * | 8/1999 | Wang | ............ | A01M 23/18 43/61 |
| 6,990,767 B1 * | 1/2006 | Margalit | ............ | A01M 23/20 43/61 |
| 7,540,109 B2 * | 6/2009 | Hall | ............ | A01M 23/20 43/58 |
| 7,987,628 B2 * | 8/2011 | Le Laidier | ............ | A01M 23/20 43/60 |
| 8,413,368 B2 * | 4/2013 | DeKalb | ............ | A01M 23/20 43/61 |
| 8,418,396 B2 * | 4/2013 | Moustirats | ............ | A01M 23/20 43/58 |
| 2005/0279015 A1 * | 12/2005 | Hall | ............ | A01M 23/08 43/66 |
| 2006/0032110 A1 * | 2/2006 | Yang | ............ | A01M 1/026 43/60 |
| 2009/0313879 A1 * | 12/2009 | Vasyl | ............ | A01M 23/34 43/87 |
| 2011/0078939 A1 * | 4/2011 | Liao | ............ | A01M 23/18 43/61 |

FOREIGN PATENT DOCUMENTS

| | | | | |
|---|---|---|---|---|
| FR | 2658385 A1 * | 8/1991 | ............ | A01M 23/20 |
| FR | 2740297 A1 * | 4/1997 | ............ | A01M 23/20 |
| FR | 2795915 A1 * | 1/2001 | ............ | A01M 23/20 |
| JP | 02203731 A * | 8/1990 | | |
| JP | 2002125570 A * | 5/2002 | | |
| JP | 2004135643 A * | 5/2004 | | |
| JP | 2012039928 A * | 3/2012 | | |
| JP | 2013005776 A * | 1/2013 | | |
| WO | WO 90/04920 | 5/1990 | | |
| WO | WO 2004/030451 | 4/2004 | | |

* cited by examiner

US 9,374,993 B2

MOUSE TRAP WITH GUILLOTINE KILLING MECHANISM

RELATED APPLICATIONS

This application is based on U.S. Provisional Application Ser. No. 61/672,870, and hereby claims the priority thereof to which it is entitled.

FIELD OF THE INVENTION

The present invention is in the field of pest control and more specifically is directed to a mouse trap.

BACKGROUND OF THE INVENTION

Current methods of capturing and/or killing rodents such as mice are unsightly, unsanitary and can be dangerous. One example of such a method is the common mouse trap with a spring operated mechanism that is released by a trigger. The trigger is actuated when a mouse attempts to remove the bait secured thereto. The spring operated mechanism snaps closed, instantly killing the rodent. The entire trap with the expired rodent is disposable. However, the sight of the dead rodent caught in the trap is not pleasant and it may spread bacteria in the area around the trap. These types of traps are also dangerous because they may injure children or family pets.

Another method of trapping and/or killing rodents such as mice involves the use of poisons. This method is not conducive to use within the home where people and pets may unknowingly handle the poison. Poison left outside the home may also kill harmless wild animals. The use of poisons may also lead to rodents expiring in undesirable areas or areas that are inaccessible, which will prevent proper disposal.

Other methods include trapping live rodents inside an enclosure or by a sticky substance placed on the bottom of a trap. These methods are also undesirable because the enclosure must typically be larger in size in order to capture and contain the rodent and creating the burden of having to dispose of the live animal.

SUMMARY OF THE INVENTION

In view of the foregoing, the present invention is directed to a mouse trap having a housing with a door, a trigger mechanism, a guillotine, and a spring element. The housing has a floor and a body defining a housing enclosure, with the housing body having a front end that is open and a rear end opposite the front end that is substantially closed by an end wall. The door is mounted to the housing adjacent the end wall and configured to fully close the substantially closed end when the door is closed. The trigger mechanism includes a lever and a catch assembly, the catch assembly having a catch operatively engaged with the lever and a setting cover.

The guillotine member is oriented substantially perpendicular to the housing floor and extends at least partly into the housing enclosure. The guillotine member is configured to engage with the catch when the trap is set, thereby holding the guillotine member in a raised position above the floor. The spring is operatively coupled between the housing and the guillotine member and biases the guillotine member to move rapidly to a lowered position adjacent the floor when the guillotine member becomes disengaged from the catch through movement of the lever by a rodent inside the housing enclosure.

The mouse trap of this invention can be reusable and preferably made of durable plastic, has a relatively simple construction, and is relatively small in size. The mechanics and physical structure of the mouse trap conceal the body of an expired rodent from view and allow for easy disposal.

Accordingly, it is an object of the present invention to provide a mouse trap having a guillotine killing mechanism that efficiently kills a rodent and does not expose people and pets to any risk of injury or sickness from contact with the dispatched mouse or the trap.

A further object of the present invention is to provide a mouse trap in accordance with the preceding objects that is simple to set and use and which requires no electrical parts.

Yet another object of the present invention is to provide a mouse trap in accordance with the preceding objects that is sturdy and reusable in both indoor and outdoor environments.

It is yet another object of the invention to provide a mouse trap that is not complex in structure and which can be manufactured at low cost but yet efficiently kills and conceals an expired rodent from view until disposal thereof.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENT

Figure 1:
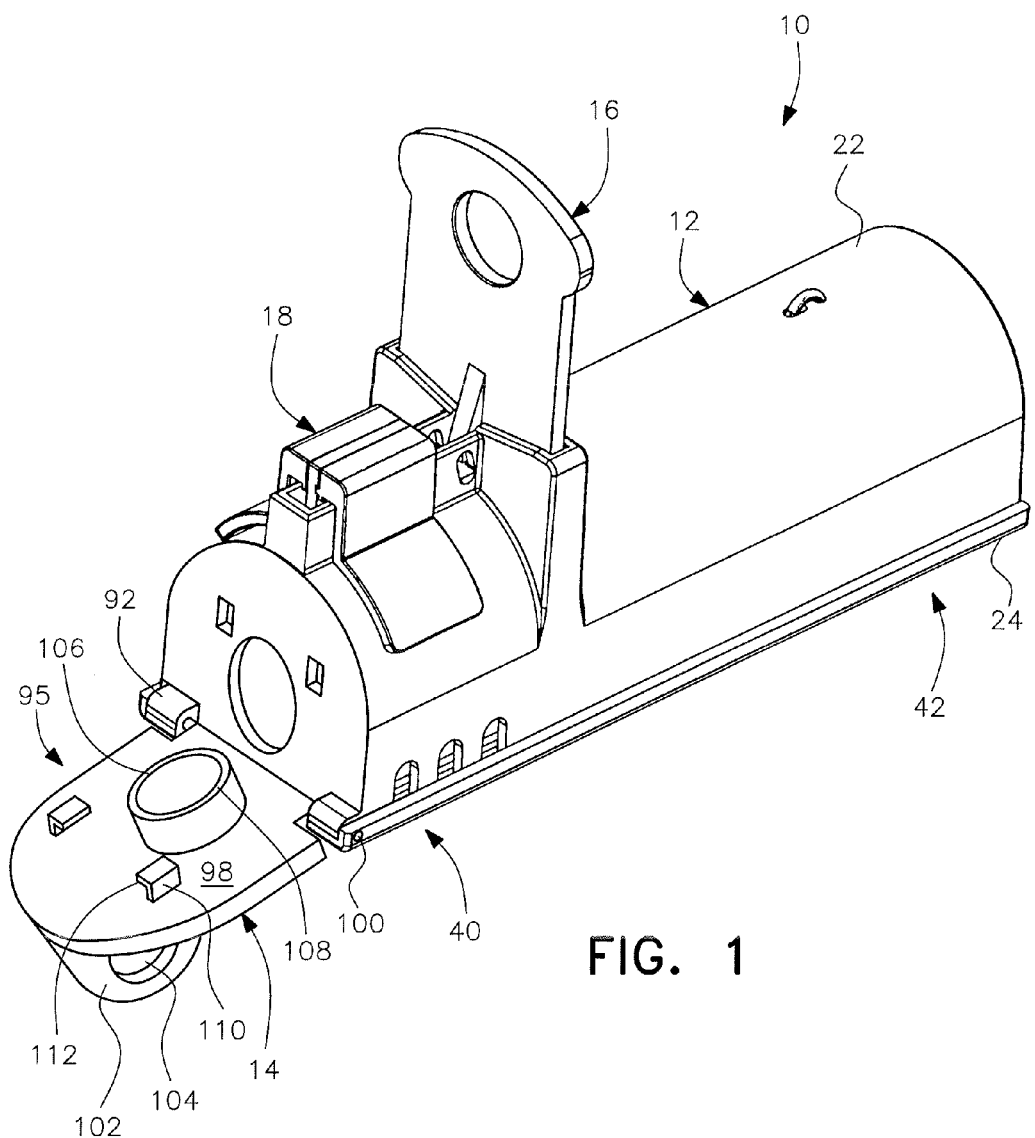
FIG. 1 is a perspective view of a mouse trap according to the present invention.
Figure 2:
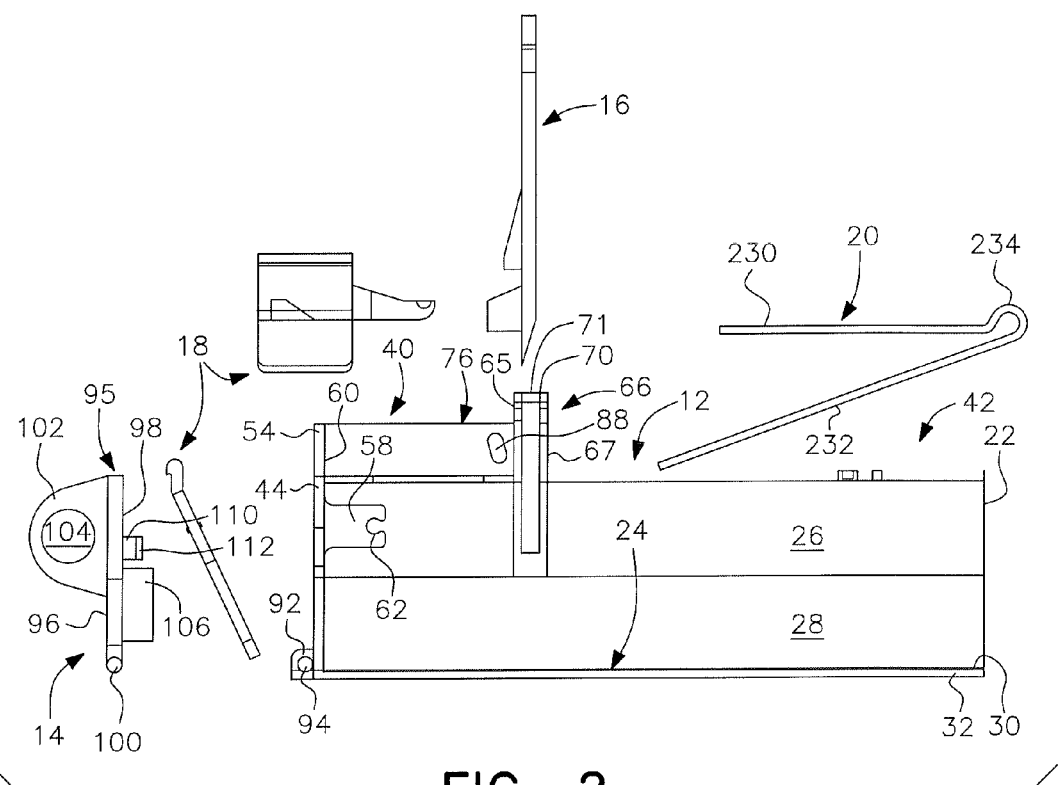
FIG. 2 is a side view of the individual parts of the mouse trap shown in FIG. 1.
Figure 3:
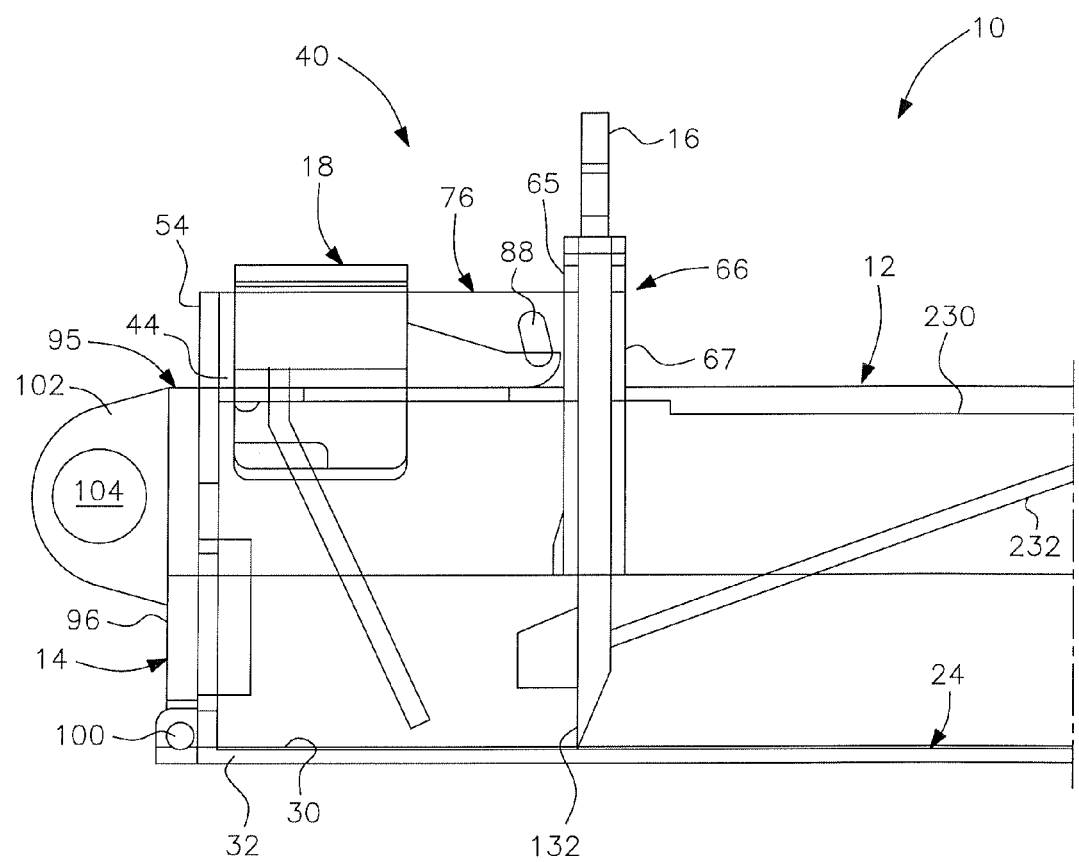
FIG. 3 is a partial cutaway side view of the mouse trap of FIG. 1, highlighting the internal components.
Figure 4:
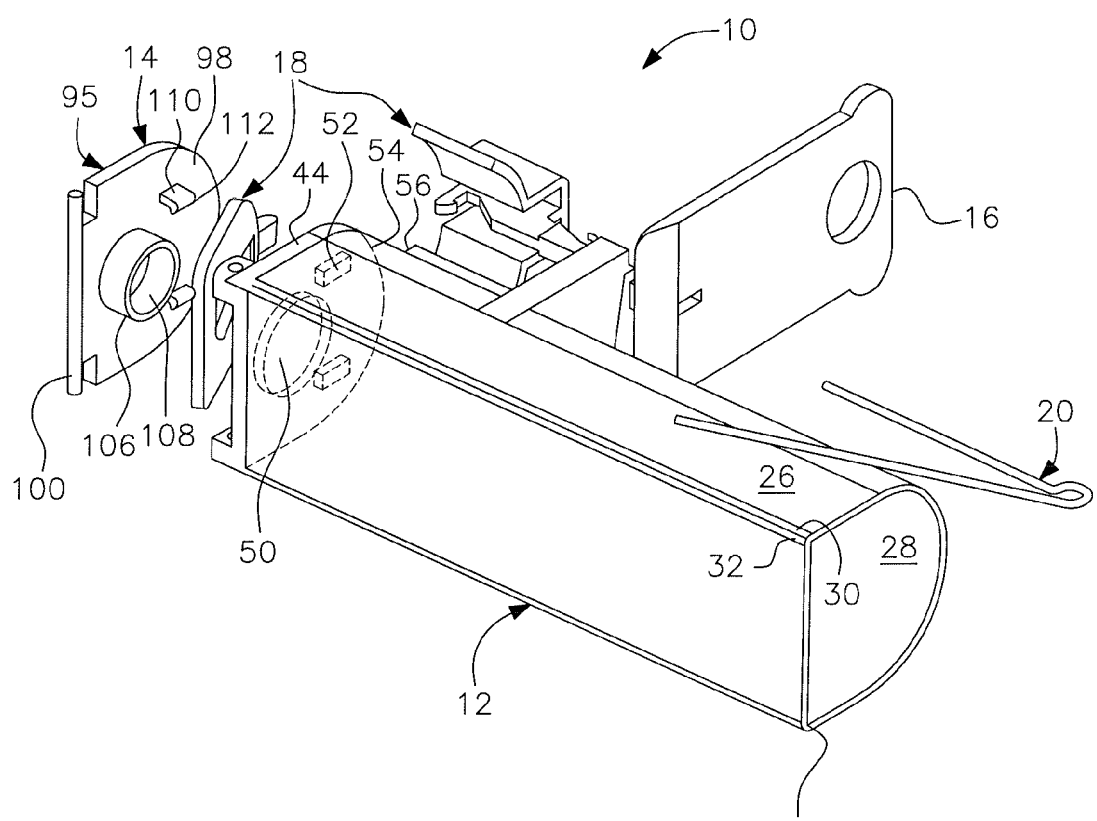
FIG. 4 is an exploded perspective view of the mouse trap of FIG. 1 rotated 90 degrees.
Figure 5:
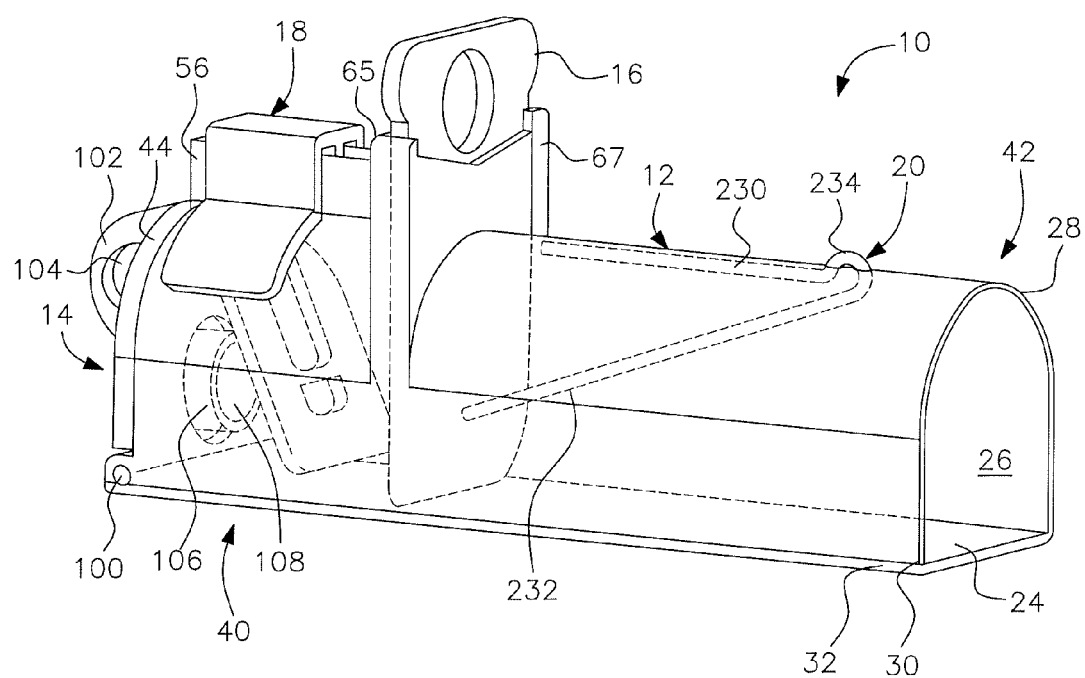
FIG. 5 is a side perspective view of the mousetrap of FIG. 1, highlighting the internal components.

Although only one embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways.

The present invention and related disclosure is directed to an improved mouse trap that is strong, relatively small, and reusable. The mouse trap also conceals the expired mouse within the trap and allows for quick and easy disposal without the need to come in contact with or handle the rodent. The mouse trap is preferably made of durable plastic but can be made out of any other suitably strong and rigid material.

As shown in FIGS. 1-5, 6A-6C, 7A-7C and 8A-8B, the present invention is directed to a mousetrap, generally designated by reference numeral 10. The mousetrap includes a housing generally designated by reference numeral 12, with a door generally designated by reference numeral 14, a guillotine generally designated by reference numeral 16, a trigger mechanism generally designated by reference numeral 18 and a spring element generally designated by reference numeral 20.

FIGS. 9A-D illustrate various views of the housing and guillotine. The housing 12 is preferably made in two pieces including an elongated generally tubular body 22 and a floor 24. The body 22 has a generally arched top portion 26 with two downwardly depending side walls 28. The floor 24 is planar and allows the mouse trap to sit flush atop a flat surface such as a building floor or the bottom of a shelf or cabinet. As used herein, the terms "top" and "upper" refer to the positioning of the identified element or component when the trap is assembled and positioned for use. The terms "bottom" and "lower" similarly refer to the positioning of the identified element or component when the trap is assembled and positioned for use. In addition, while the housing and mating components, such as the door and the trigger mechanism, are described as having arched top portions, the top of the housing and the mating components could be flat or have other shapes complementary to one another as would be understood by persons of ordinary skill in the art.

Figure 6A:
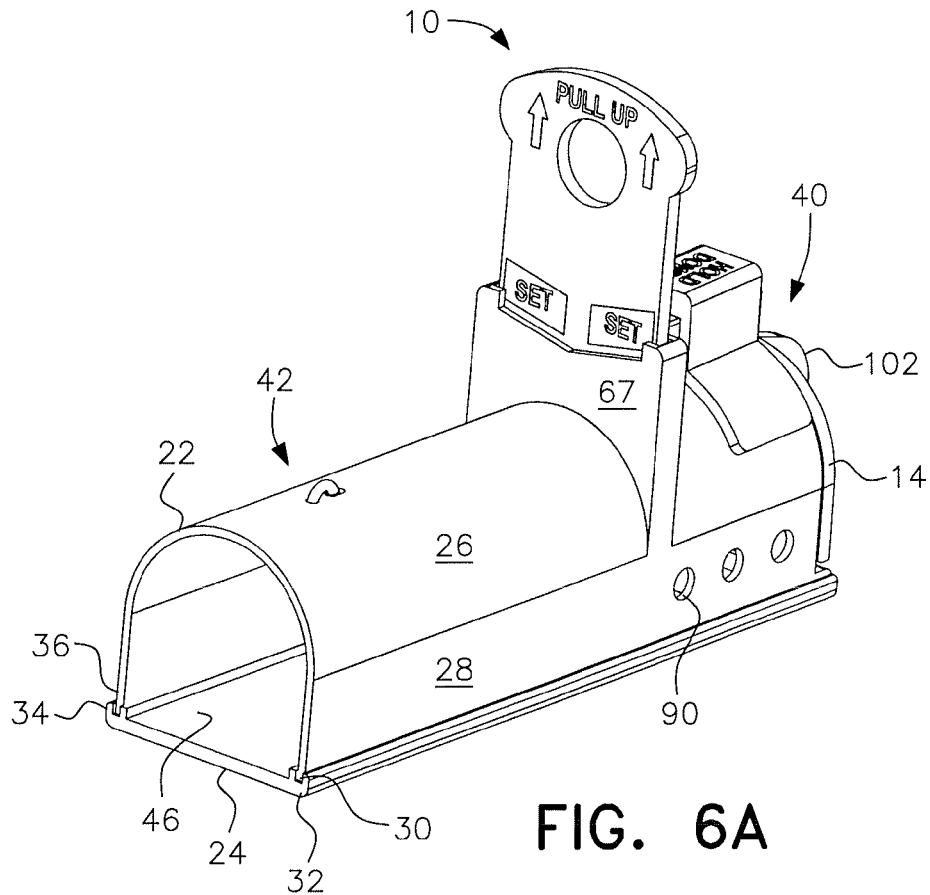
FIG. 6A is a front perspective view showing the open end of the mousetrap of FIG. 1.
Figure 8A:
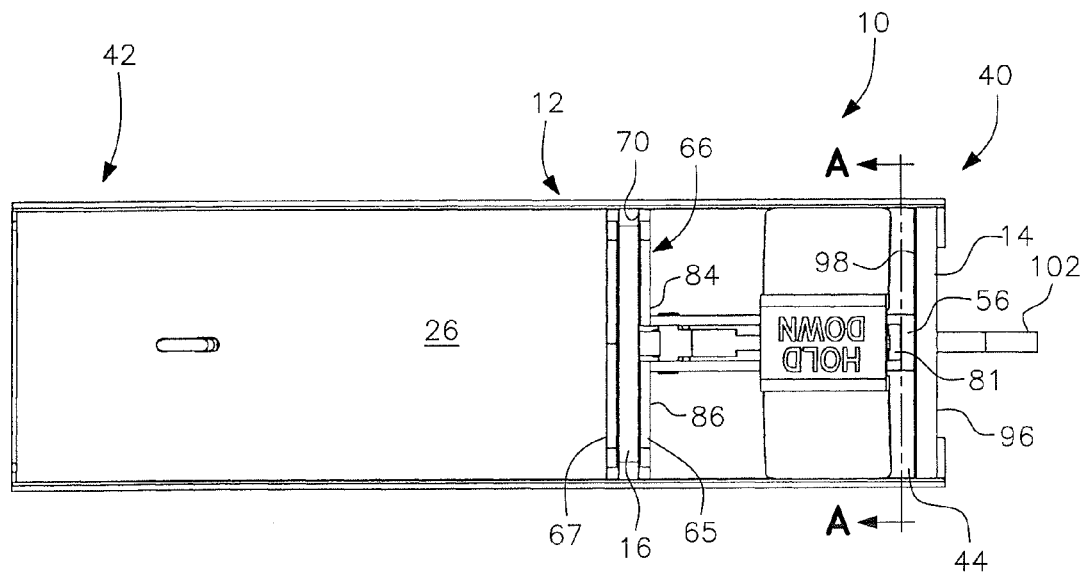
FIG. 8A is top view of the mousetrap shown in all of the preceding drawing Figures in the set position.
Figure 8B:
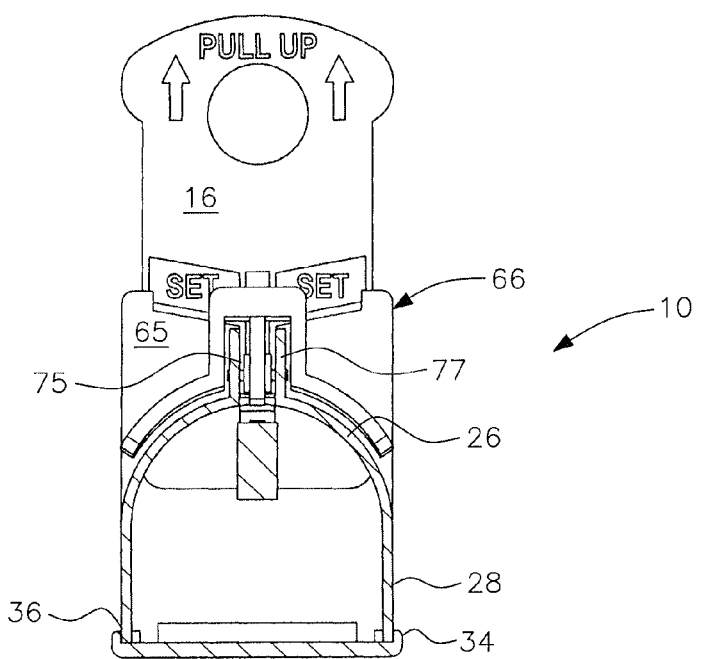
FIG. 8B is a sectional view of the mousetrap taken along line A-A of FIG. 8A, showing the trap in the set condition.

The lower edges 30 of the side walls 28 of the body 22 are coupled to the outer longitudinal edges 32 of the floor 24 and are permanently connected thereto to form the housing which defines an inner enclosure. The body 22 and floor 24 may be welded or glued together or otherwise attached with suitable fasteners. The body and floor may also be coupled to one another using molded structural elements or features that fit with one another. As best shown in FIGS. 6A, 8B and 9D, the edges 32 of the floor may be formed with an upwardly extending lip 34 forming a channel 36 into which the lower edges 30 of the side wall are received.

The housing 12 has a rear end generally designated by reference numeral 40 and a front end generally designated by reference numeral 42 opposite the rear end. The rear end 40 of the housing is substantially closed by an end wall 44 and the front end of the housing is completely open, providing an entrance, generally designated by reference numeral 46, through which a rodent may enter the housing enclosure. As used herein, "rear" or "rearwardly" refers to that part of the housing nearest the substantially closed end of the trap or that part of a component facing the rear end, and "front" or "forward" refers to that part of the trap nearest the trap entrance or that part of a component facing the front end of the trap. In a preferred embodiment, the housing is made of plastic but it can be made out of any other suitably strong and rigid material.

The end wall 44 of the housing 12 has a central aperture 50 and two smaller apertures 52 positioned on opposite sides of and spaced from the central aperture 50. In the embodiment shown in the drawing Figures, and best seen in FIGS. 9A and 9B, the central aperture is circular and the two smaller apertures 52 are each generally rectangular; these particular shapes are representative, however, as other shapes may alternatively be used as would be understood by persons of ordinary skill in the art. The top 54 of the end wall 44 is generally arched to mate with the arched top portion of the housing. In addition, the top 54 of the end wall 44 includes an upper extension or tab 56 that, in the embodiment shown, is generally rectangular.

As can be seen in FIGS. 2-4 and 7A-7C, an arm 58 projects forwardly into the housing enclosure from the inner side 60 of the end wall 44 above the central aperture 50. The forward end of the arm has a generally C-shaped cutout 62 that is open toward the front end 42 of the trap and acts as a pivot axis for a tripping element of the trap as will be described hereinafter.

Extending upwardly from the generally arched top portion 26 of the housing body 22 are two pairs of substantially parallel walls, best seen in FIGS. 9A-9D. The first pair of walls, generally designated by reference numeral 66, is substantially parallel with the end wall 44 and thus transverse to the longitudinal length of the housing 12, and includes a rear wall 65 and a front wall 67 that are spaced from one another to form a guillotine channel 70 therebetween. Accordingly, the first pair of walls 66 are also referred to herein as the guillotine channel walls 66. The top 71 (see FIG. 2) of the guillotine channel 70 is open for insertion of the guillotine 16 as will be described hereinafter.

Figure 9A:
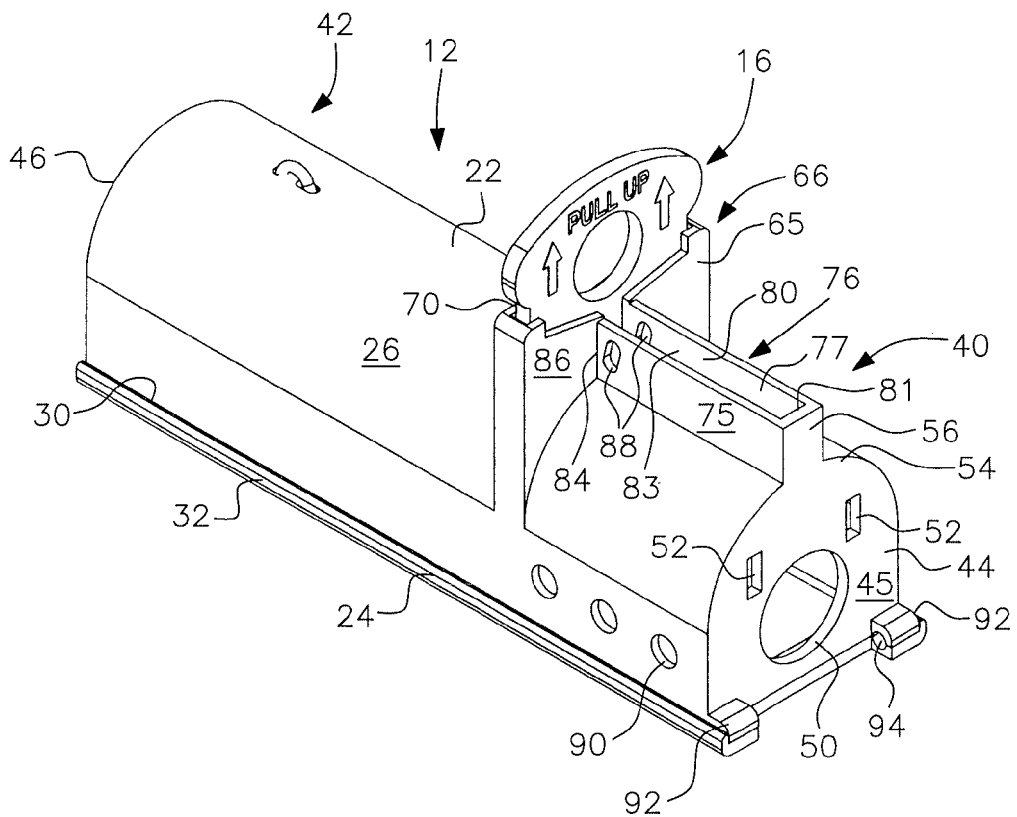
FIG. 9A is a rear perspective view of the housing and guillotine components, without the door and trigger mechanism, of the mousetrap shown in FIGS. 1-8.
Figure 9B:
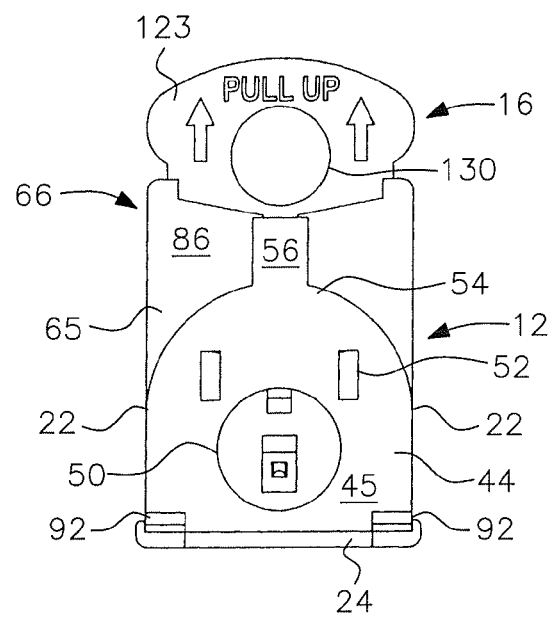
FIG. 9B is a rear view of the mousetrap housing and guillotine components shown in FIG. 9A.
Figure 9C:
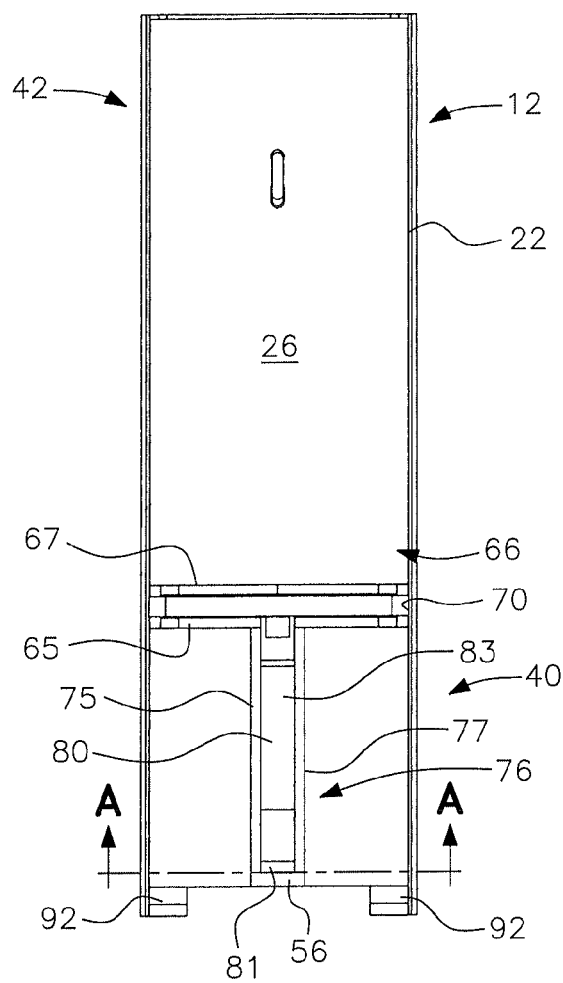
FIG. 9C is a top view of the mousetrap housing and guillotine components shown in FIGS. 9A and 9B.
Figure 9D:
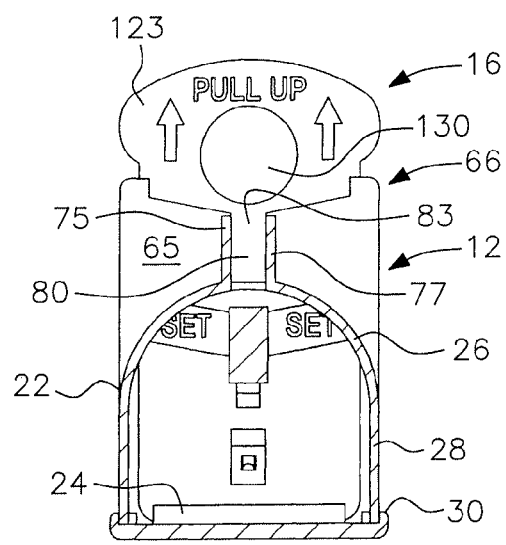
FIG. 9D is a sectional view of the mousetrap housing and guillotine components taken along line A-A of FIG. 9C.

The second pair of walls, generally designated by reference numeral 76, extend longitudinally along the top portion of the housing 22 and include a first wall 75 and a second wall 77 that are substantially perpendicular to the guillotine channel walls 66 (see FIGS. 1 and 9A-9D). Like the guillotine channel walls 66, the second pair of walls 76 are spaced from one another to form a channel 80 therebetween, referred to herein as the trigger channel 80. Accordingly, the second pair of walls are also referred to herein as the trigger channel walls 76. The rear end 81 of the trigger channel 80 is closed by the upper extension or tab 56 of the end wall 44 as shown in FIGS. 1, 9A and 9B. The forward edges 84 of the trigger channel walls 76 are in abutment with the rearward face 86 of the rear wall 65 of the guillotine channel walls (see FIGS. 9A and 9C). The top 83 of the trigger channel 80 is open (see FIGS. 8B, 9A, 9C, and 9D) to receive a portion of the trigger mechanism 18 as will be described hereinafter.

Just rearwardly of the forward edges 84, each of the trigger channel walls 76 has an aperture 88 formed therein. The two apertures 88 are transversely aligned with one another, and in the embodiment shown, each of the apertures 88 is oblong. The upper ends of the oblong apertures 88 tilt rearwardly so that the bottom ends of the oblong apertures are closer to the rear guillotine channel wall 65 than the upper ends of the oblong apertures.

The side walls 28 of the housing body 22 are preferably provided with air holes 90 that allow light to enter the rear end 40 of the housing and also enable the fragrance of any bait that is placed inside the housing to waft out through the sides of the housing, increasing the likelihood of a rodent being attracted to the trap.

Two base flanges 92 project rearwardly from the bottom of the outer rear face 45 of the end wall 44 and the floor 24, one on either side of, and outside, the housing, as best seen in FIGS. 1, 2, 3, 6B, 9A and 9B. Each base flange 92 defines an aperture 94 (see FIGS. 2 and 9A) that is preferably substantially circular. The apertures 94 are transversely aligned with one another.

As shown in FIGS. 1-4, the door 14 includes a generally planar member, generally designated by reference numeral 95, having a rear or outside surface 96 and a front or inside surface 98 opposite the outside surface 96. The door also has outwardly projecting pivot rods 100 along the door lower edge by which the door is hingedly attached to the base flanges 92 of the housing. The outside surface 96 of the door 14 has a handle 102 that projects generally perpendicular to the planar member 95. In the embodiment shown, the handle has a finger opening 104, by which a user can grip the handle and pull outward to open the door. The inside surface 98 of the door has a raised circular ridge that creates an inwardly projecting collar 106. The collar 106 forms a recess 108 into which the user can place rodent bait. The collar 106 corresponds in size and shape to the central aperture 50 in the end wall 44 of the housing 12 so that when the door 14 is closed, the collar 106 on the inside surface 98 of the door fits within the central aperture 50 in the housing end wall.

The inside surface 98 of the door also includes two forwardly protruding tabs 110. In the embodiment shown, these tabs 110 are rectangular and correspond in size to the two rectangularly shaped apertures 52 on the end wall 44 of the housing so that when the door is closed the two tabs 110 fit within the two corresponding end wall apertures 52. The inside edge of each of the tabs has a small lip 112 (see FIGS. 1, 2 and 4) so that the door can be removably secured to the end wall of the trap housing through engagement of the tab lips with the end wall apertures.

Turning to FIGS. 9A-9D and 10A-10D in particular, the guillotine 16 is a thin substantially planar element that is received within the guillotine channel 70 of the trap housing (see FIGS. 1, 3, 5, 6A-6C, 7A-7C, 8A-8B and 9A-9D). The guillotine 16 includes a rear surface 114 as shown in FIGS. 10A-10D, and a front surface 116 opposite the rear surface and shown in FIGS. 10C-10E. As shown in the side view of the guillotine shown in FIG. 10C, the front surface 116 of the guillotine is substantially flat while the rear surface 114 includes a rearward facing setting ledge 118 and a rearwardly projecting boss 120 located proximate to the bottom end 122 of the guillotine. The boss 120 forms a small channel 124 proximate to the bottom end 122 of the guillotine that is open on the front surface of the guillotine 16 (see FIGS. 7A-7C) which accepts one end of the spring 20. The setting ledge 118 and the boss 120 with associated channel 124 work cooperatively with the trigger mechanism 18 to set the guillotine 16 in a raised position, thereby setting the mouse trap as will be explained hereinafter.

Figure 10A:
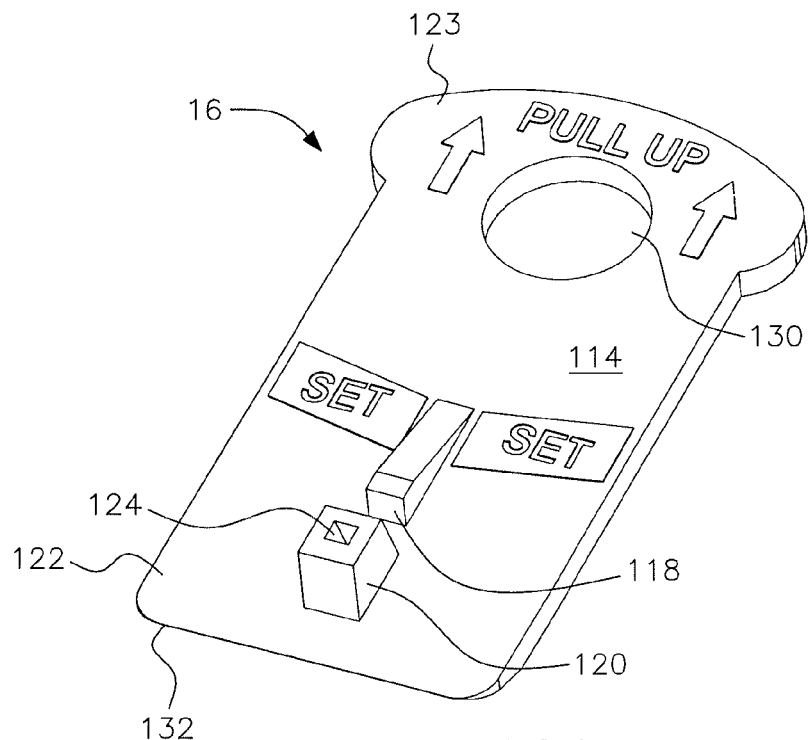
FIG. 10A is a perspective view of the rear side of the guillotine component of the mousetrap shown in all of the preceding Figures.
Figure 10B:
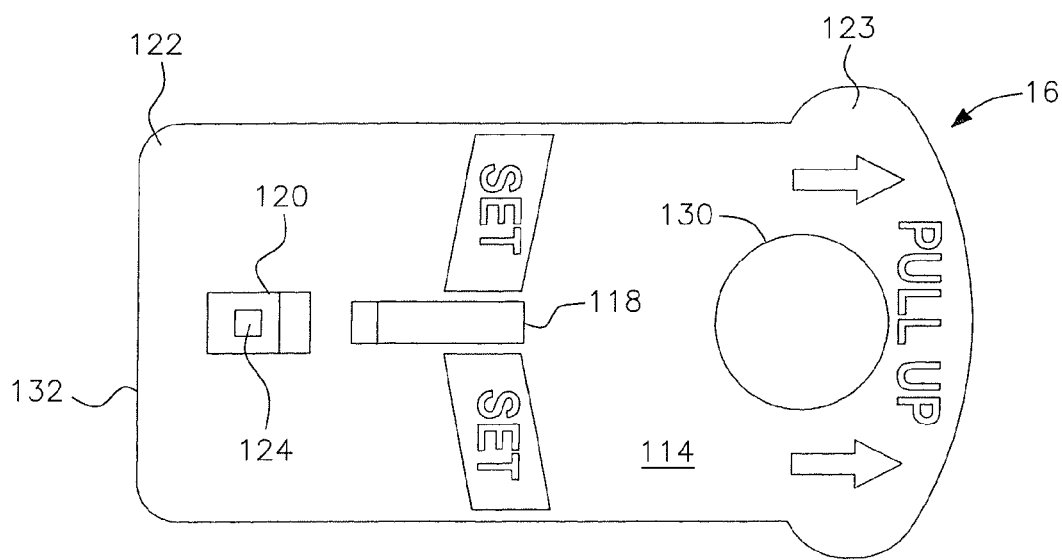
FIG. 10B is a top view of the rear side of the guillotine component shown in FIG. 10A.
Figure 10C:
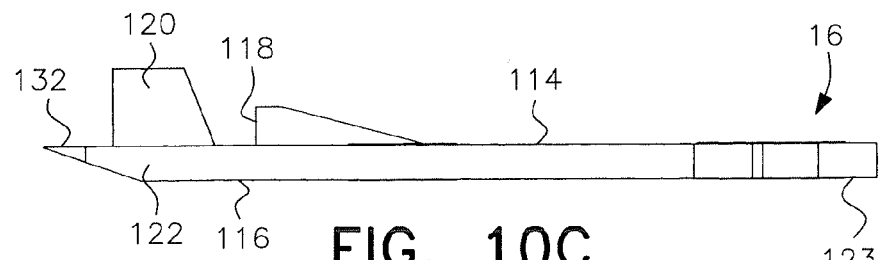
FIG. 10C is a side view of the guillotine component shown in FIGS. 10A and 10B, with the rear side facing upwardly.
Figure 10D:
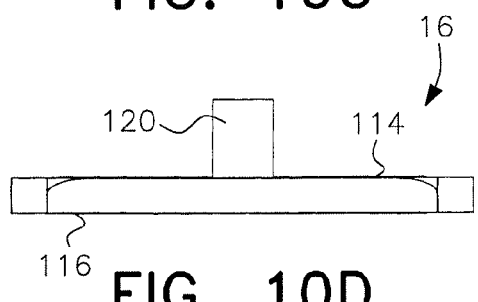
FIG. 10D is a bottom end view of the guillotine component shown in FIGS. 10A-10C, with the rear side facing upwardly.
Figure 10E:
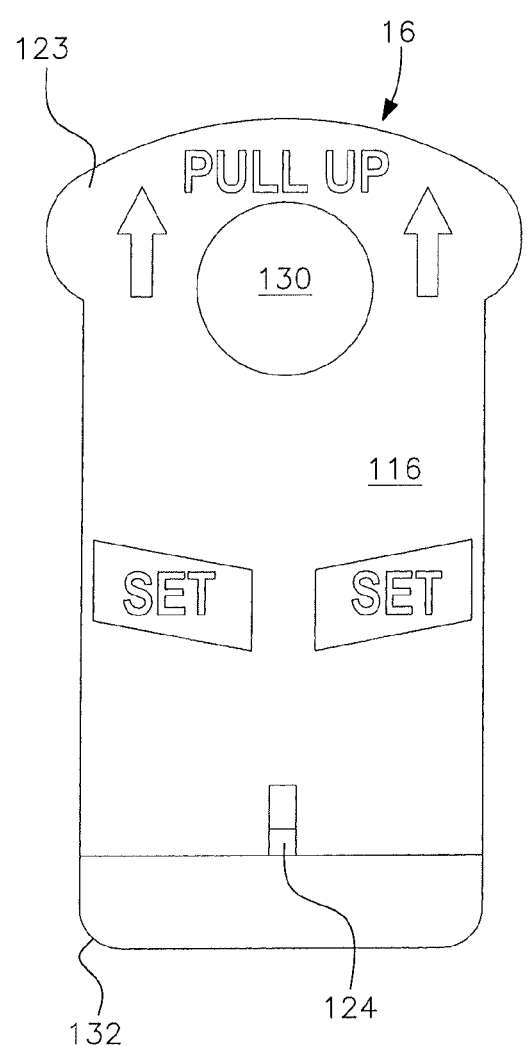
FIG. 10E is a top view of the front side of the guillotine component shown in FIGS. 10A-10D.

As shown in FIG. 10E, the front surface 116 of the guillotine also has a circular aperture 130 passing through the rear and front surfaces 114, 116 that is located proximate to the top end 123 of the guillotine. The circular aperture 130 enables a user to better grip the guillotine element between his or her thumb and forefinger and pull up on the guillotine to set the mouse trap. The bottom of the guillotine is tapered to a sharp knife-like edge 132 for killing a mouse when the trap is tripped.

Figure 11A:
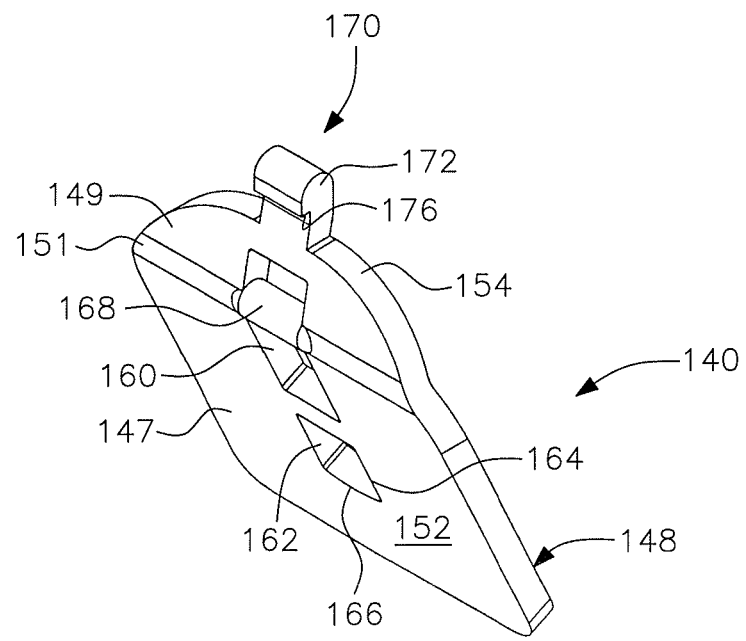
FIG. 11A is a perspective view of the rear side of the lever of the mousetrap shown in FIGS. 1-7C.
Figure 11B:
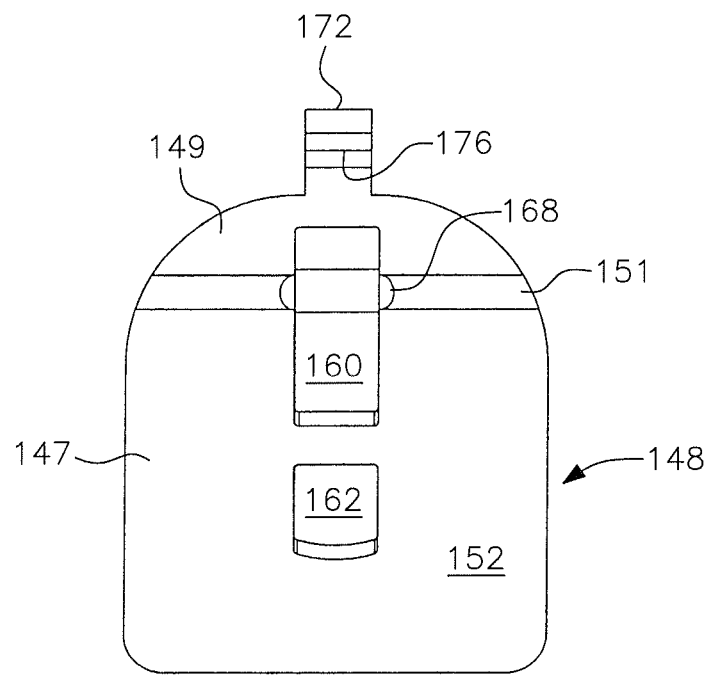
FIG. 11B is a top view of the rear side of the lever shown in FIG. 11A.
Figure 11C:
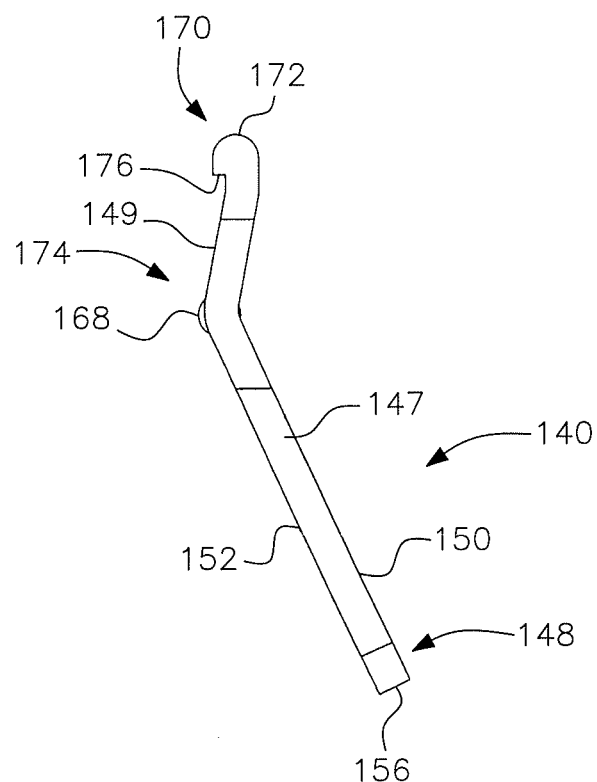
FIG. 11C is a side view of the lever shown in FIGS. 11A and 11B.
Figure 11D:
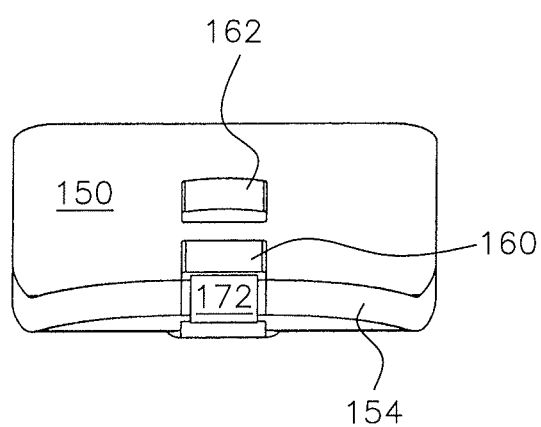
FIG. 11D is a top end view of the lever shown in FIGS. 11A-11C, with the rear side facing upwardly.
Figure 12A:
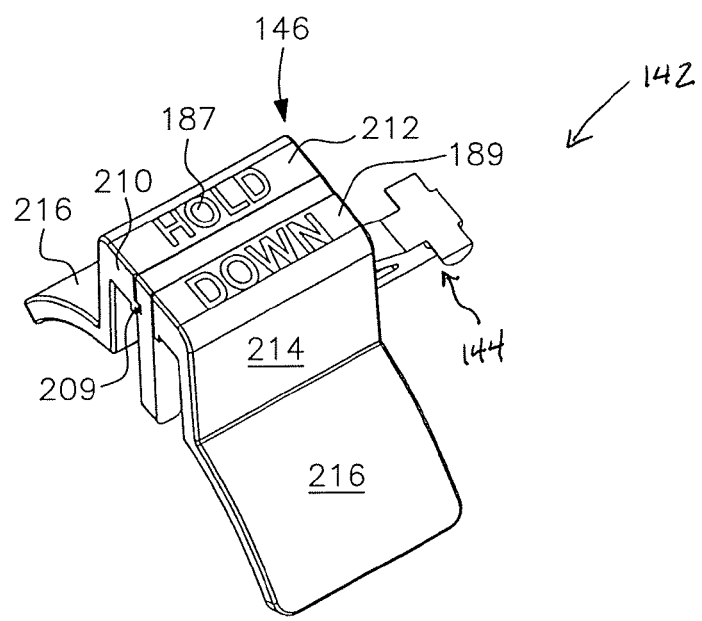
FIG. 12A is an assembled rear view of the catch assembly including the catch and setting cover of the trigger assembly for the mousetrap shown in FIGS. 1-7C.
Figure 12B:
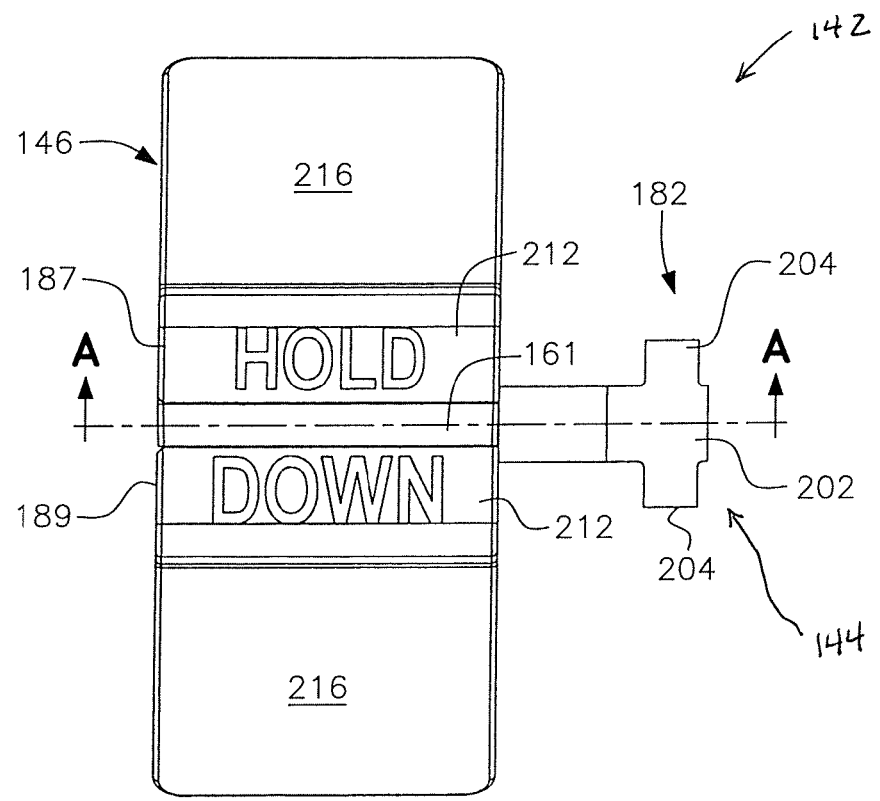
FIG. 12B is a top view of the assembled catch assembly shown in FIG. 12A.
Figure 12C:
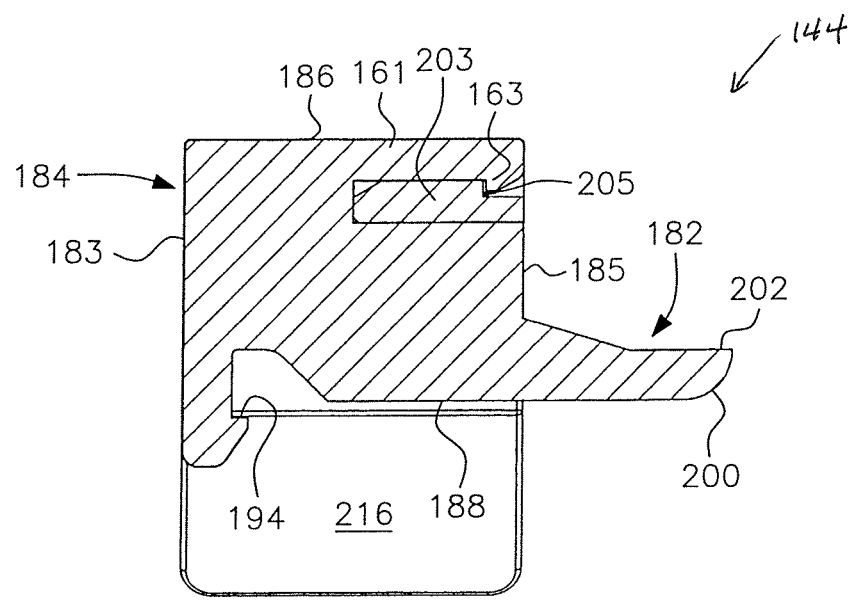
FIG. 12C is a sectional view taken along line A-A of FIG. 12B.

The trigger mechanism 18 includes a lever, generally designated by reference numeral 140, and illustrated in isolation in FIGS. 11A-11D, and a catch assembly, generally designated by reference numeral 142, and illustrated in isolation in FIGS. 12A and 12B. The catch assembly 142 includes a catch, generally designated by reference numeral 144, and a setting cover generally designated by reference numeral 146. Various views of the catch 144 are shown in FIGS. 13A-13D. The trigger mechanism 18 as assembled is shown in FIGS. 14A-14D.

The lever 140 has a substantially planar body, generally designated by reference numeral 148, having a front side 150 shown in FIGS. 11C and 11D, and a rear side 152 shown in FIGS. 11A, 11B and 11C. An upper portion 149 of the body bends forwardly along a bending line 151 so as to be at an angle with respect to a lower portion 147 of the body 148. The upper edge 154 of the upper portion 149 of the lever body 148 is arched to correspond in shape with the arched top portion 26 of the housing. The bottom edge 156 of the lower portion 147 of the body 148 is generally straight and is adjacent the floor 24 of the housing when the trap is assembled.

The lever body 148 includes an upper aperture 160 and a lower aperture 162. As shown in FIGS. 11A and 11B, the upper aperture 160 is elongated and generally rectangular and extends into both the top portion 149 and the lower portion 147 of the body 148. The lower aperture 162, in the lower portion of the body 148, is generally square in shape with three straight walls 164 and one curved wall 166. These particular shapes of the apertures are not necessary, however. The lower aperture is provided to enable the mouse to see through the lever body 148 to the bait and therefore may be formed in almost any shape for this purpose. The upper aperture 160 may also vary in shape but needs to allow for the rotation of the lever body within the hinge arm cutout 62.

Extending transversely across the upper elongated aperture 160 and in alignment with the bending line 151 is a pivot bar 168 that is generally cylindrical in lateral cross-section. The pivot bar 168 is hingedly received within the hinge cutout 62 formed in the forwardly projecting arm 58 of the end wall 44 of the housing, enabling the lever 140 to pivot on the pivot bar 168.

The top of the upper portion 149 has a head, generally designated by reference numeral 170, having a rounded upper surface 172. The head 170 has a rear side, generally designated by reference numeral 174, with a lip 176 that engages the catch 144 when the trap is set as will be described hereinafter. The lever 140 is positioned proximate to the end wall 44 of the trap housing when the trap is assembled. When the pivot bar 168 is positioned in the cutout 62, the upper portion 149 is substantially vertical in orientation while the lower portion 147 slopes forwardly from the pivot bar 168 to the bottom edge 156 (see FIGS. 7A-7C). The distance between the bottom edge 156 of the lever body 148 and the guillotine 16, as measured along the longitudinal length of the trap, is preferably between about 0.50 inches and about 0.60 inches, and is about 0.56 inches in a preferred embodiment. This distance, and the confining width of the trap, determines the location and orientation of a rodent relative to the guillotine before the trap is tripped by contact of the rodent with the lever 140. In particular, the noted distance between the bottom edge 156 of the lower portion 147 of the lever body and the guillotine ensures that when the rodent has entered the trap and reached the lever, the position of the rodent will provide for effective placement of the guillotine blow to the rodent.

Various views of the catch 144 are provided in FIGS. 13A-13D. The catch 144 has a generally planar body, generally designated by reference numeral 180, with a forward end generally designated by reference numeral 182, and a rearward end generally designated by reference numeral 184. The rear end 184 has a generally flat upper surface 186 and a generally flat lower surface 188. The body 180 has an elongated cutout 181 extending generally parallel with both the upper and lower surfaces 186, 188 that extends to an approximate midpoint between the rear edge 183 and the front edge 185 of the body 180. Extending from the rearmost end 179 of the cutout to the rear edge 183 is a channel 177 cut into one side of the catch body 180 (see FIGS. 13B and 13D). The cutout 181 creates an arm 161. The forwardmost end of the arm 161 has a downwardly directed hook 163.

Figure 7A:
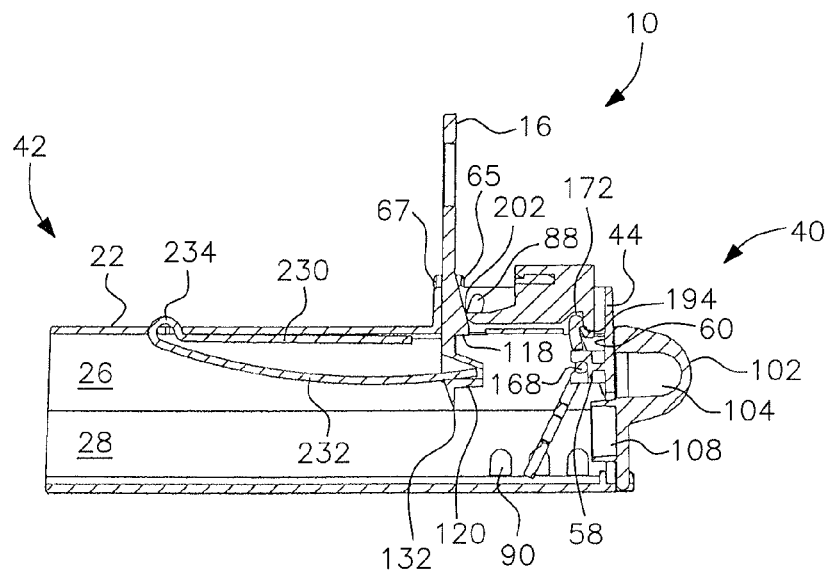
FIG. 7A is a sectional view of the mousetrap taken along line A-A of FIG. 6C, illustrating the process of raising the guillotine to set the trap.
Figure 7B:
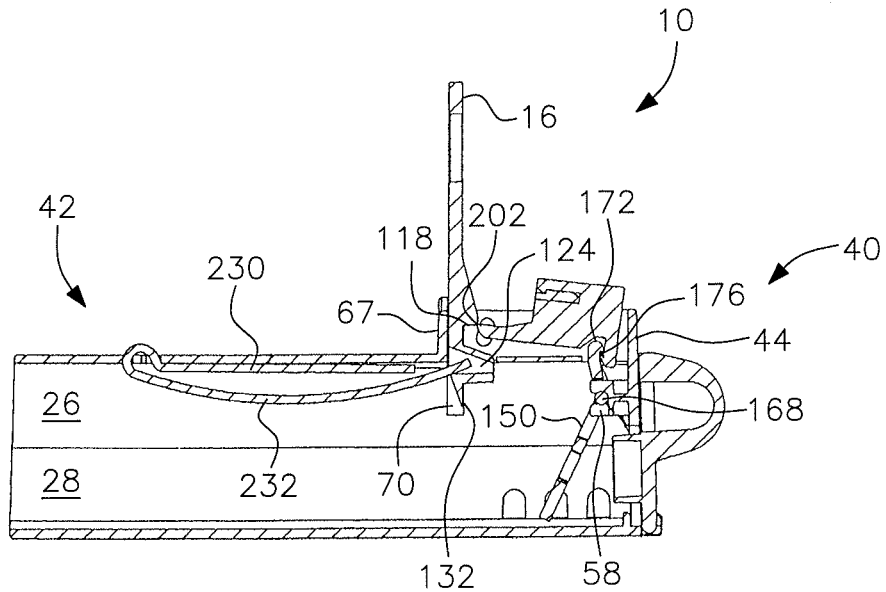
FIG. 7B is a sectional view of the mousetrap taken along line A-A of FIG. 6C with the guillotine raised further and almost to the set position.
Figure 7C:
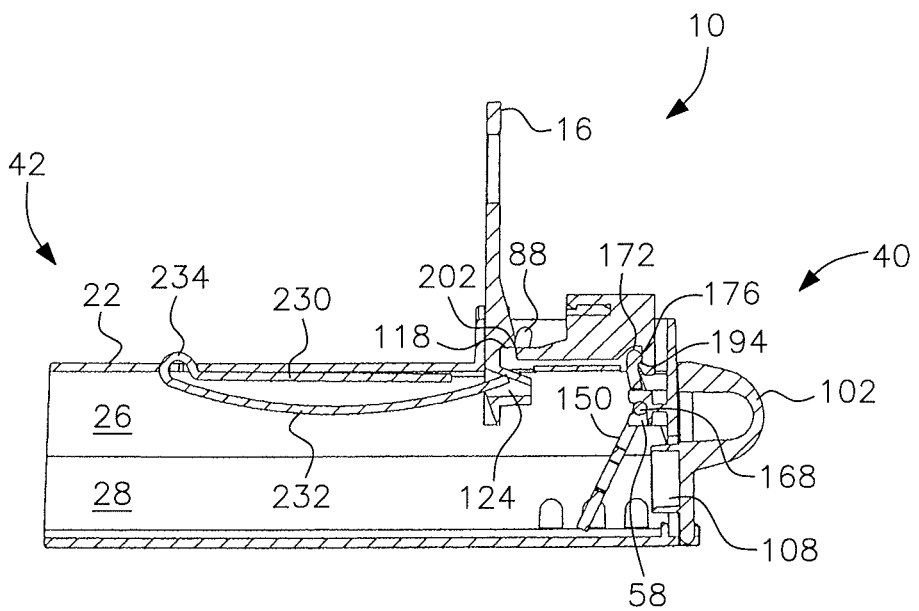
FIG. 7C is a sectional view of the mousetrap taken along line A-A of FIG. 6C, showing the guillotine fully raised with the trap in the set condition.

The generally flat lower surface includes an upwardly tapered cutout, generally designated by reference numeral 190. The rearmost part of the rearward end 184 has a forwardly facing hook 194 positioned beneath the cutout 190 that engages the lip 176 of the lever head 170 when the trap is set. As shown in FIGS. 7A-7C, the pivot axis created by the cutout 62 in the arm 58 is preferably in vertical alignment with, or slightly rearward of or forward of, the point of engagement between the lip 176 and the hook 194. This substantially vertical alignment reduces the forces on the lip and hook engagement that would otherwise tend to trip the trap too easily due to the tension on the catch 144 imposed by the spring 20.

The forward end 182 of the catch 144 includes a forwardly extending arm 196 that is generally parallel with the longitudinal length of the housing. As shown in the drawing Figures, the arm 196 has a lateral thickness greater than that of the body 180 of the catch. This additional thickness locates and guides the catch within the trigger channel 80. In the embodiment shown, each side of the arm 196 has a cutout 191 that assists during manufacture of the catch which is preferably molded. The cutouts 191 are not necessary, however.

The forwardmost tip 198 of the arm 196 has an upwardly curved bottom surface 200 and a flat upper setting platform 202. The curved bottom surface 200 allows the trap to be easily set. Just rearwardly of the forward tip 198, the arm 196 has lateral projections 204 on either side that extend generally perpendicularly to the planar sides of the lever. The lateral projections 204 are received within the oblong apertures 88 formed in the trigger channel walls 76. As shown in FIGS. 13A-13D, the upper surfaces 206 of the projections 204 are generally flat and the bottom surfaces 208 thereof are rounded. The rounded shaping of the bottom surfaces 208 allows the catch to rotate when the trap is triggered.

Figure 12D:
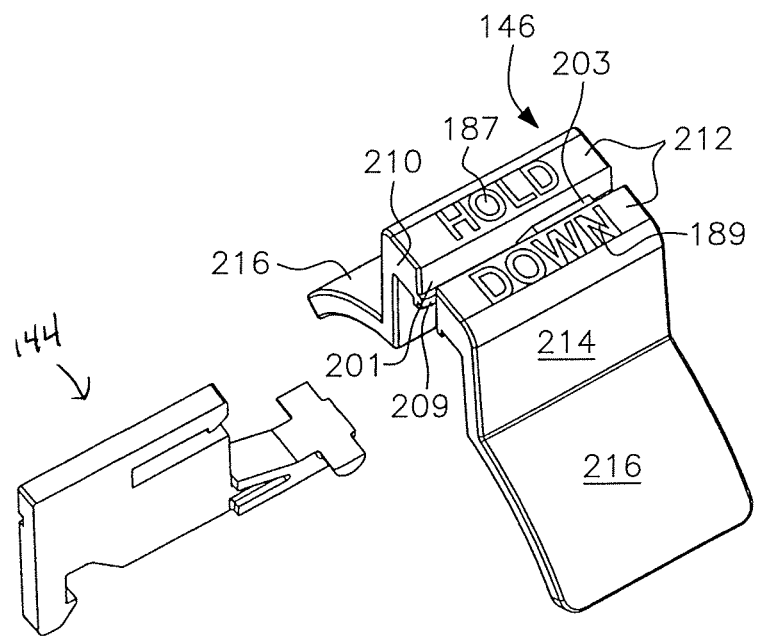
FIG. 12D is an exploded view of the catch and setting cover shown in FIG. 12A.
Figure 12E:
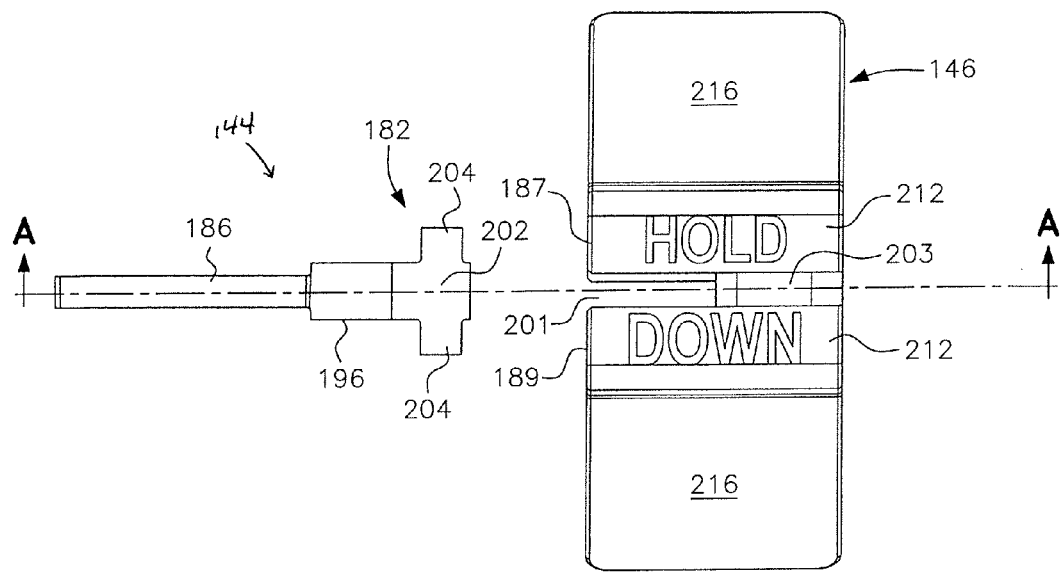
FIG. 12E is a top view of the catch and setting cover shown in the exploded view of FIG. 12D.
Figure 12F:
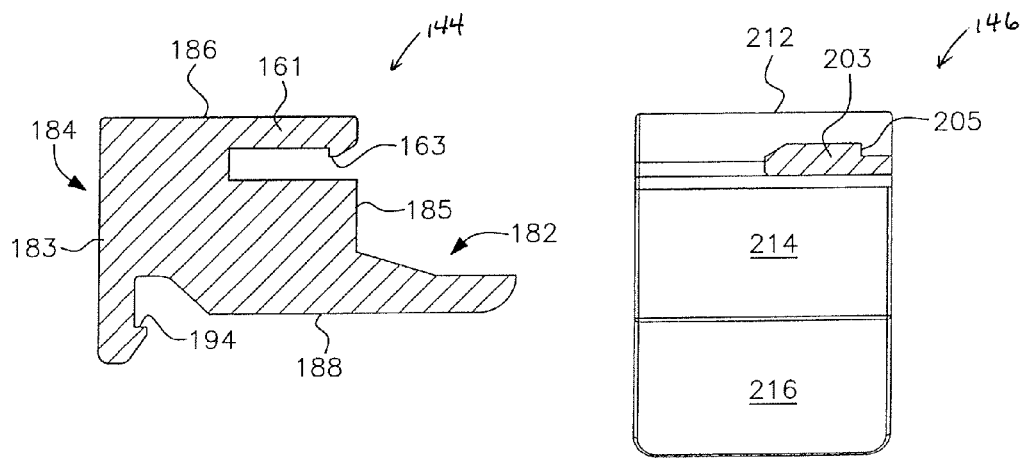
FIG. 12F is a sectional view of the catch and setting cover taken along line A-A of FIG. 12E.
Figure 13A:
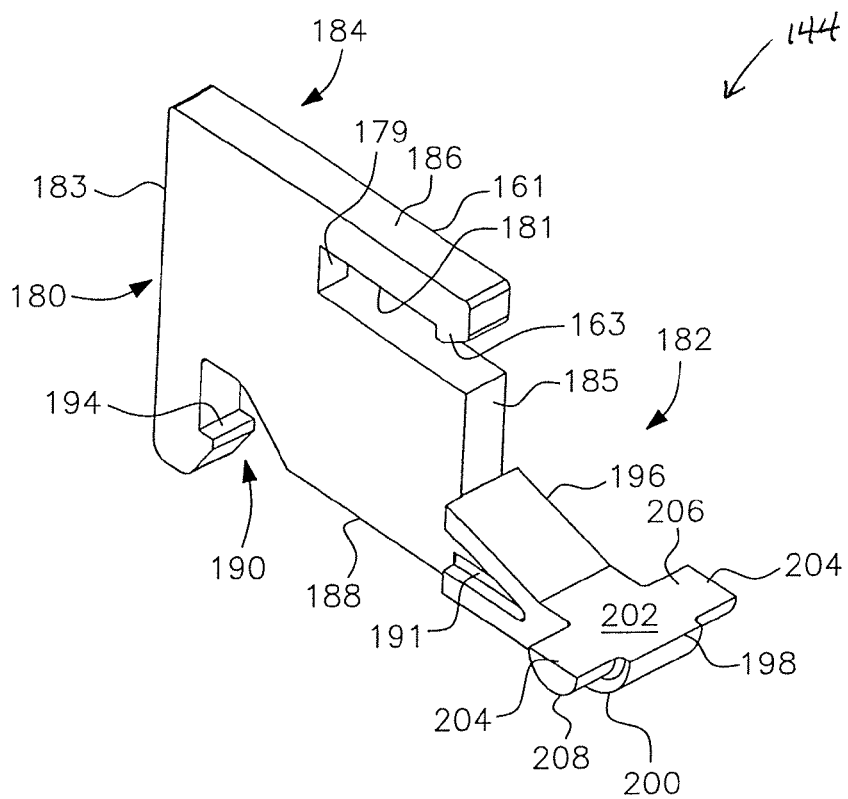
FIG. 13A is an upper perspective front end view of the catch shown in FIGS. 12A and 12B.
Figure 13B:
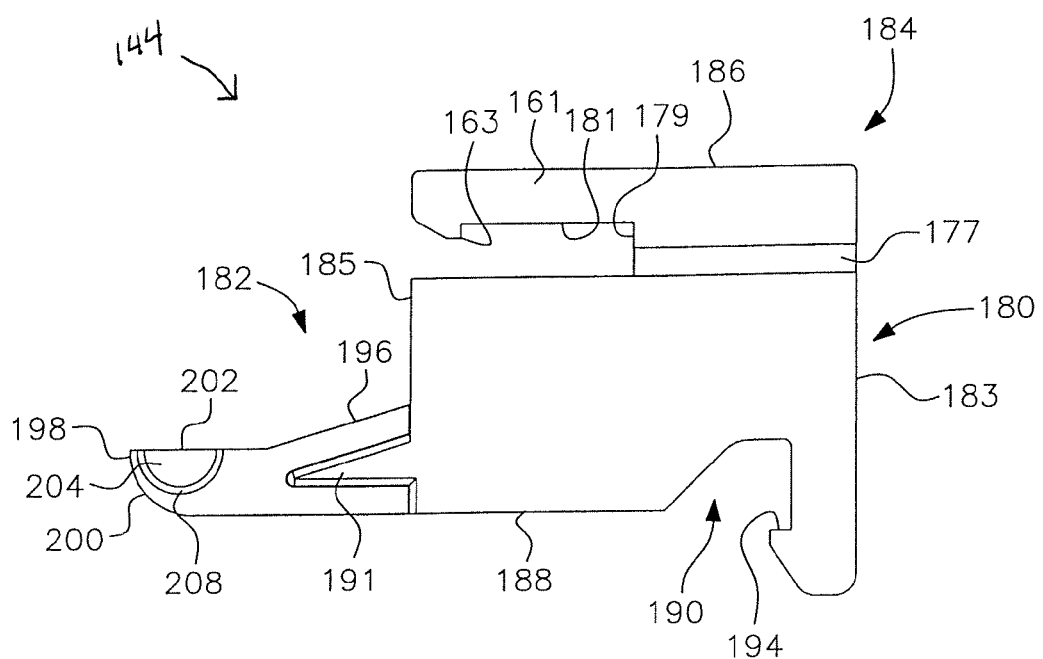
FIG. 13B is a side view of the catch shown in FIG. 13A.
Figure 13C:
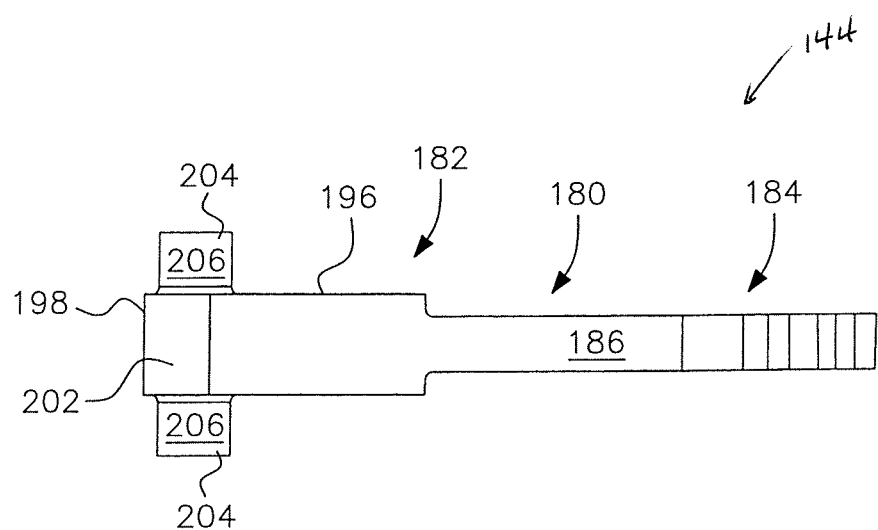
FIG. 13C is a bottom view of the catch shown in FIGS. 13A and 13B.
Figure 13D:
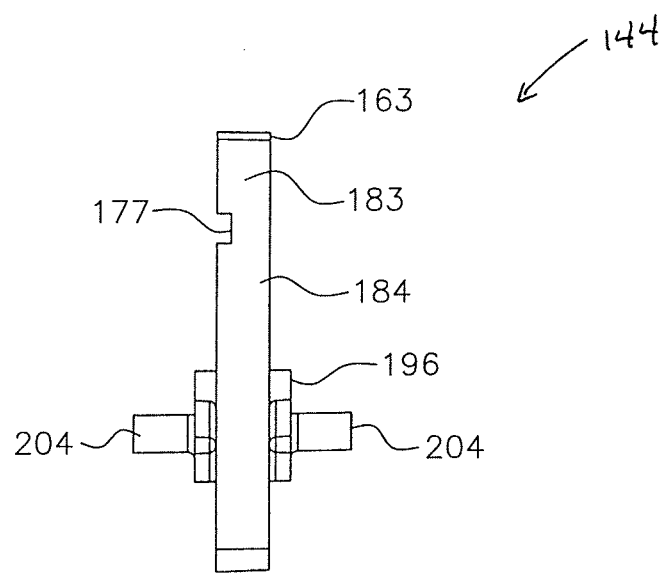
FIG. 13D is a rear end view of the catch shown in FIGS. 13A-13C.

The setting cover 146 has an inverted U-shaped portion 210 with a generally flat top 212 partially divided along a center line of the top by a channel 201 to form a first side 187 and a second side 189 (see FIGS. 12D and 12E). The first side 187 has an inwardly directed lip 209 that extends longitudinally along the edge of the channel 201. The setting cover also includes two generally vertical side walls 214, and two downwardly directed arms 216 extending from the bottom of the side walls 214 that are curved to fit against the arched top portion 26 of the housing (see FIGS. 12A-12F).

The forward end of the cover 146 includes a bridge 203 that joins the first side 187 and the second side 189 to one another. The forward end of the bridge 203 includes a ledge 205. To join the catch and the setting cover, the arm 161 of the main body 180 of the catch 144 is received within the channel 201 while the lip 209 is inserted into the channel 177 in the side of the catch. When the catch is fully mounted, the hook 163 engages the ledge 205 of the bridge 203 to secure the catch 144 to the setting cover 146.

Figure 14A:
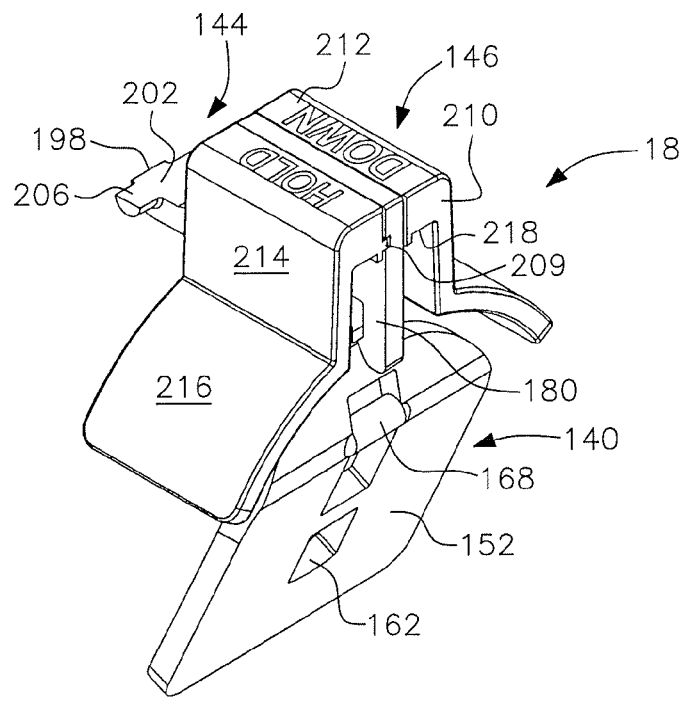
FIG. 14A is an upper rear perspective view of the assembled trigger assembly of the mousetrap shown in FIGS. 1-7B.
Figure 14B:
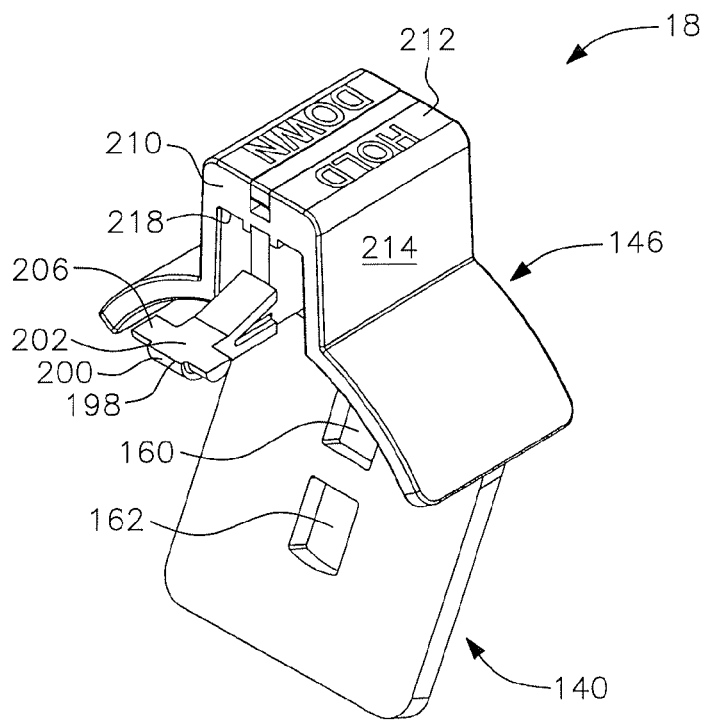
FIG. 14B is an upper front perspective view of the assembled trigger assembly shown in FIG. 14A.
Figure 14C:
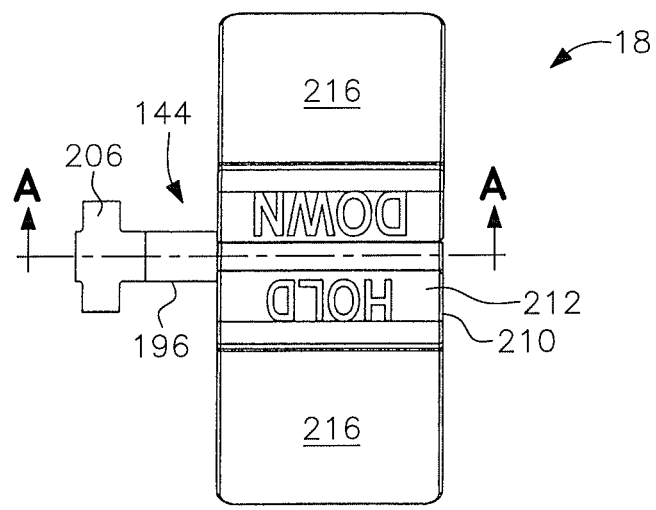
FIG. 14C is a top view of the assembled trigger assembly shown in FIGS. 14A and 14B.
Figure 14D:
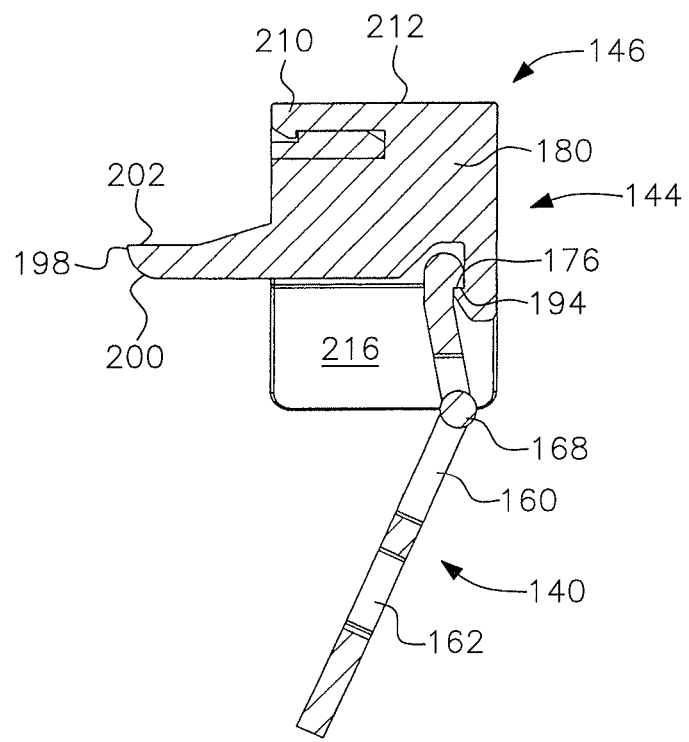
FIG. 14D is a side sectional view of the assembled trigger assembly taken along line A-A of FIG. 14C.

The complete trigger mechanism 18 as assembled is shown in FIGS. 14A-14D. The body 180 of the catch 144 is positioned within the U-shaped portion 210 of the setting cover 146 with the arm 161 of the main body 180 within the channel 201. The forwardly extending arm 196 projects out from beneath the setting cover 146. The lever 140 is positioned with the lip 176 on the head 170 of the lever arm held against the upper surface of the hook 194 on the rearward end of the catch, as shown in FIG. 14D.

The spring element 20, shown in FIGS. 2-5 and 7A-7C, is preferably a spring wire having an upper leg 230 and a lower leg 232 joined by a curved portion 234. The upper leg 230 is oriented longitudinally along the roof inside the housing enclosure. The arched portion 26 of the housing body 22 has an opening in the top through which the curved portion 234 protrudes. The lower leg 232 is received within the channel 124 formed by the boss that projects from the rear side of the guillotine 16. The spring 20 exerts downward tension on the guillotine 16 when the trap is set and enables the guillotine to spring downwardly with force once the trigger mechanism is activated. The guillotine tip is preferably not sharp enough to decapitate the rodent but is strong enough to inflict mortal injury and pin the dead rodent against the floor of the trap. The tunnel design of the trap housing is very effective in properly orienting the rodent while the guillotine is positioned at a set distance with respect to the trip mechanism to ensure an effective and well-placed blow as described earlier herein.

As shown in FIGS. 3, 5, 6A and 7A-7C, when the trap is assembled, the guillotine 16 is received within the guillotine channel 70 and the catch 144 of the trigger assembly 142 is received within the trigger channel 80 so that the setting cover 146 is supported on the upper surface of the housing. The pivot bar 168 of the lever 140 is hingedly mounted within the C-shaped cutout 62 in the hinge-forming arm 58 on the housing end wall 44, with the lever arm lip 176 at the top of the lever held in abutment against the hook 194 on the catch. In the unset position shown in FIGS. 3 and 5, the lower tip 132 of the guillotine is adjacent, or in contact with, the floor 24 of the housing and the lateral projections 204 on the forward end of the catch are positioned at the bottom ends of the oblong apertures 88.

To activate the mouse trap, the user first opens the door 14 and places bait inside the circular collar 106 provided on the inside of the door. The user then closes the door and sets the trap by using one hand to hold down the setting cover 146 of the trigger mechanism while at the same time using the other hand to pull up on the guillotine 16. As the guillotine moves upwardly (see FIGS. 7A-7C), tension is increased upon the spring 20. While the projections 204 on the forward end of the catch remain captured by the apertures 88 in the trigger channel walls 76, the play provided by the angled oblong shape of the apertures 88 enables the forward end 182 of the catch to move upwardly with the projections 204 moving upwardly in the slots 88 (see FIG. 7B). Once the setting ledge 118 on the guillotine 16 clears the setting platform 202 on the catch (see FIG. 7C), the forward end of the catch moves down so that the engagement between the setting ledge 118 and the setting platform 202 prevents the guillotine from moving back down. The trap is then set, with the projections 204 positioned in the bottom of the slots 88.

When a mouse attempts to reach the bait located in the bait collar on the door, the mouse will touch or move the lever 140. The lower portion of the lever moves from left to right, with respect to the trap as shown in FIGS. 7A-7C, through pivoting movement of the lever on the pivot rod 168 within the cutout 62 in the hinge forming arm 58. This pivoting movement causes the head 172 of the lever arm 170 to move counter-clockwise(to the left in FIGS. 7A-7C) so that the lip 176 on the lever arm head 170 is disengaged from the catch hook 194. Once the catch hook 194 is released, the front of the catch 144 is free to move downwardly under the force of the spring 20. Downward movement of the front of the catch into the trigger channel is sufficient to disengage the guillotine ledge 118 from the support platform 202 of the catch, releasing the guillotine from its set position The guillotine, with the force of the spring, is then free to descend in a quick downward motion through the guillotine channel and into the housing of the mouse trap, thereby striking and instantly killing the mouse.

To empty the device once a mouse has been caught therein, the user simply pulls up on the guillotine to release the mouse from its pinned position against the floor, and then drops the mouse into a proper disposal container through the open front end of the trap. The user is spared from having to see or handle the expired rodent because it is substantially contained within the housing and the mechanics allow for easy removal without the user having any contact with the expired rodent. The trap is sturdy and reusable in both indoor and outdoor environments, requiring no electrical or electronic parts or mechanisms.

While the exact dimensions of the trap may be varied, representative dimensions are described hereinafter.

Figure 6B:
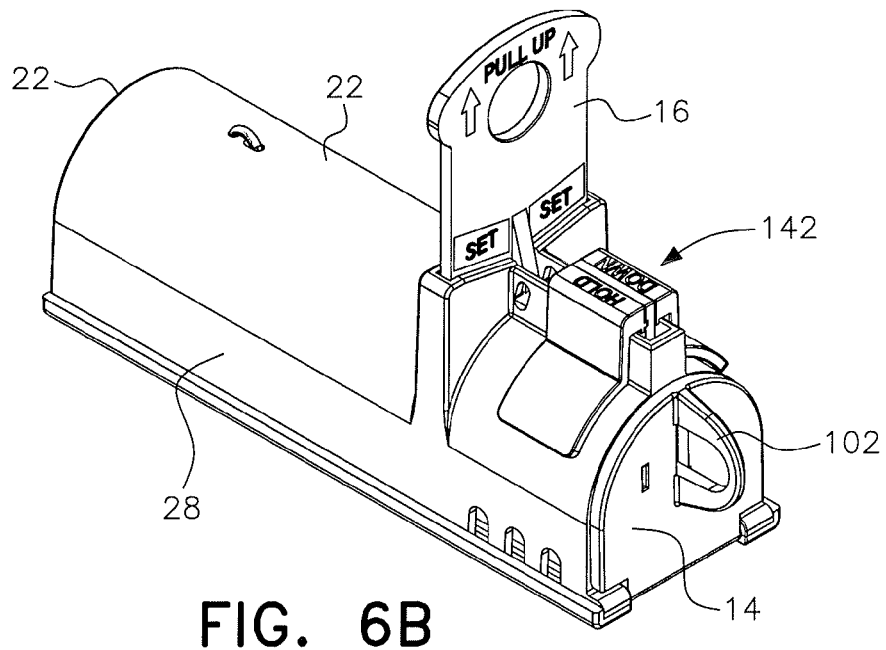
FIG. 6B is a rear perspective view of the mousetrap of FIG. 6A.
Figure 6C:
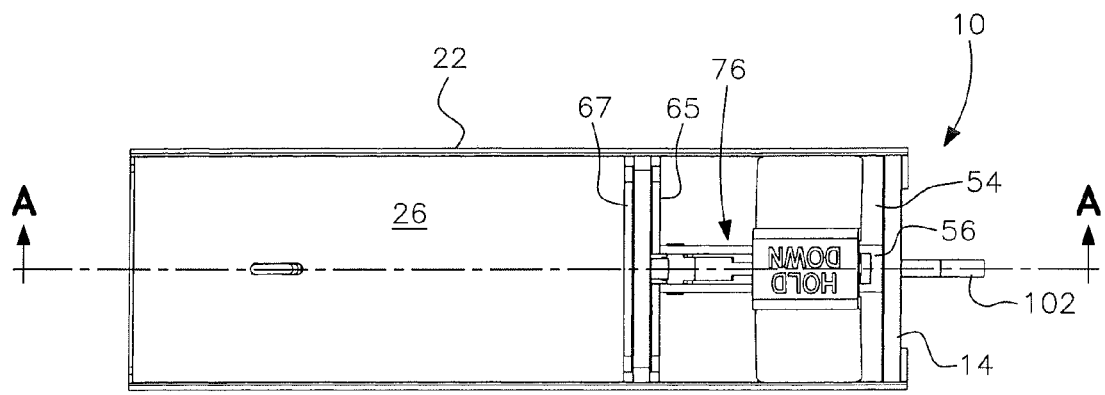
FIG. 6C is a top view of the mousetrap shown in FIG. 6A.

In the assembled and set position of the trap as shown in FIGS. 6A-6C, the overall height of the trap including the guillotine is from between about 3 inches to about 4 inches, and is about 3.27 inches in a preferred embodiment. In the set position, the lower edge of the guillotine is approximately 0.81 inches above the floor of the trap. When the trap is tripped, the overall height of the trap is reduced to be between about 2 inches to about 3 inches, and is about 2.47 inches in a preferred embodiment.

The height of the tunnel-shaped housing is between about 1.3 inches and about 1.4 inches, and is about 1.35 inches in a preferred embodiment. The distance from the floor of the trap to the top of the guillotine channel, as projecting above the housing, is between about 1.7 inches and about 1.8 inches, and is about 1.77 inches in a preferred embodiment. The distance from the floor of the trap to the top of the trigger assembly, as projecting above the housing, is between about 1.75 inches and about 1.9 inches, and is about 1.84 inches in a preferred embodiment.

The overall length of the trap, including the handle, is between about 4.5 inches and about 5.5 inches, and is about 5.0 inches in a preferred embodiment. The length of the housing without the handle is between about 4.0 inches and about 5.2 inches, and is about 4.65 inches in a preferred embodiment.

The exterior width of the trap is about 1.45 inches to about 1.65 inches, and is about 1.55 inches in a preferred embodiment. The interior width of the housing is between about 1.2 inches and about 1.4 inches, and is about 1.3 inches in a preferred embodiment.

The distance from the guillotine in the guillotine channel 70 to the open front end of the trap, as measured along the longitudinal length of the trap, is between about 2.75 inches and about 3.5 inches, and is about 3.22 inches in a preferred embodiment.

The inside distance between the collar 106 with the bait recess 108 and the guillotine, as measured along the longitudinal length of the trap, is between about 0.75 inches to about 1.25 inches, and is about 1.1 inches in a preferred embodiment.

The foregoing is considered as illustrative only of the principles of the invention. Since numerous modifications and changes will readily occur to those skilled in the art, it is not desired to limit the invention to the exact construction and operation shown and described. Accordingly, all suitable modifications and equivalents may be resorted to, falling within the scope of the invention.

What is claimed is:

1. A mouse trap comprising:
   a housing having a floor and a body defining a housing enclosure, said body having two side walls defining a width of said body, an open front end and a closed rear end, said housing including a first pair of walls spaced from one another to form a guillotine channel having an open top, and a second pair of walls spaced from one another to form a trigger mechanism channel that is narrower in width than said width of said body and has an open top, said guillotine channel extending downwardly into the housing enclosure, said trigger mechanism channel extending generally perpendicular to said guillotine channel with one end of said trigger mechanism channel being in abutment with said guillotine channel;
   a trigger mechanism including a lever and a catch assembly, the catch assembly including a setting cover and a catch operatively engaged with said lever, said catch being positioned adjacent an upper surface of said housing and being at least partly received within the open top of said trigger mechanism channel;

a guillotine member received within the guillotine channel through the open top thereof, said guillotine member oriented substantially perpendicular to the housing floor and configured to engage with said catch when the trap is set, engagement of said catch with said guillotine member holding the guillotine member in a raised position above the floor; and a biasing member operative to move said guillotine member rapidly to a lowered position adjacent the floor when the guillotine member becomes disengaged from said catch through movement of the lever by a rodent inside the housing enclosure.

2. A mouse trap comprising:

a housing having a floor and a body defining a housing enclosure, said body having a front end that is open and a rear end opposite said front end that is substantially closed by an end wall, said end wall. having at least one aperture therein;

an arm projecting forwardly into the housing enclosure from an inner side of the end wall, a forward end of the arm having a generally C-shaped cutout that is open toward the front end of the housing body;

a door mounted to the housing adjacent the end wall and configured to fully close said substantially closed end when the door is closed;

a trigger mechanism including a lever and a catch assembly having a catch operatively engaged with said lever;

a guillotine member oriented substantially perpendicular to the housing floor and extending at least partly into said housing enclosure, said guillotine member configured to engage with said catch when the trap is set, engagement of said guillotine member with said catch holding the guillotine member in a raised position above the floor; and a spring operatively coupled between the housing and the guillotine member, said spring biasing said guillotine member to move rapidly to a lowered position adjacent the floor when the guillotine member becomes disengaged from said catch through movement of the lever a rodent inside the housing enclosure.

3. The mouse trap as set forth in claim 2, wherein said housing includes a first pair of walls that are transverse to a longitudinal length of said housing, said first pair of walls including a front wall and a rear wall spaced from one another to create a guillotine channel therebetween, said guillotine member being received and movable within said guillotine channel.

4. The mouse trap as set forth in claim 3, wherein said housing includes a second pair of walls that are substantially parallel with the longitudinal length of said housing, said second pair of walls being spaced from one another to create a trigger mechanism channel therebetween, said catch of said trigger mechanism being at least partly received within said trigger mechanism channel.

5. The mouse trap as set forth in claim 4, wherein forward edges of the second pair of walls are in abutment with a rearward face of the rear wall of the first pair of walls, each wall of the second pair of walls having an oblong aperture therein positioned rearwardly of the forward edges, the oblong apertures of the second pair of walls being transversely aligned with one another with respect to the longitudinal length of said housing.

6. The mouse trap as set forth in claim 5, wherein upper ends of the oblong apertures tilt rearwardly so that bottom ends of the oblong apertures are closer to the rear wall of the first pair of walls than the upper ends of the oblong apertures.

7. The mouse trap as set forth in claim 1, wherein said lever includes an aperture with a pivot bar extending transversely across said aperture, said pivot bar being generally cylindrical in shape and hingedly received within the cutout of the arm projecting forwardly into the housing enclosure from an inner side of the end wall of the housing, enabling the lever to pivot on the pivot bar.

8. The mouse trap as set forth in claim 7, wherein said lever includes a generally planar body having an arched upper edge from which a head extends upwardly and forwardly, said head having a rear side with a lip that engages the catch when the trap is set, the lever being positioned proximate to the end wall of the housing body when the trap is assembled.

9. The mouse trap as set forth in claim 8, wherein the catch includes a generally planar body with a generally flat upper surface, a lower surface having an upwardly tapered ramp, a rear end and a forward end, said rear end having a forwardly facing hook positioned beneath the tapered ramp that engages the lip of the lever arm when the trap is set.

10. A mouse trap comprising:

a housing having a floor and a body defining a housing enclosure, said body having a front end that is open and a rear end opposite said front end that is substantially closed by an end wall, said end wall having at least one aperture therein;

a door mounted to the housing adjacent the end wall and configured to fully close said substantially closed end when the door is closed;

a trigger mechanism including a lever and a catch assembly having a catch operatively engaged with said lever;

a guillotine member oriented substantially perpendicular to the housing floor and extending at least partly into said housing enclosure, said guillotine member configured to engage with said catch when the trap is set, engagement of said guillotine member with said catch holding the guillotine member in a raised position above the floor, a front surface of the guillotine member being substantially flat and a rear surface of said guillotine member including a cutout that forms a setting ledge and a rearwardly projecting boss having a channel therein located proximate to a bottom end of the guillotine member, said setting ledge and said boss operative with the trigger mechanism to set the guillotine member in a raised position to set the trap; and a spring operatively coupled between the housing and the guillotine member, said spring biasing said guillotine member to move rapidly to a lowered position adjacent the floor when the guillotine member becomes disengaged from said catch through movement of the lever by a rodent inside the housing enclosure.

11. The mouse trap as set forth in claim 10, wherein the spring includes an upper leg and a lower leg joined by a curved portion, said upper leg positioned parallel with an upper surface of said housing inside the housing enclosure and said lower leg being angled downwardly with respect to said upper leg, a free end of said lower leg being received in said boss channel proximate to the bottom end of the guillotine member.

12. The mouse trap as set forth in claim 10, wherein the catch includes a generally planar body with a generally flat upper surface, a lower surface having an upwardly tapered ramp, a rear end and a forward end, said forward end of the catch including a forwardly extending arm that is generally parallel with a longitudinal length of the housing, a forward tip of the arm having a curved bottom surface and a flat upper setting platform, said setting ledge of said guillotine member resting on said setting platform when the trap is set.

13. The mouse trap as set forth in claim 12, wherein said housing includes a pair of trigger channel walls spaced from one another to create a trigger mechanism channel therebetween, said catch of said trigger mechanism being at least partly received within said trigger mechanism channel, each of the trigger channel walls having an oblong aperture, the oblong apertures being transversely aligned with one another with respect to the longitudinal length of said housing and upper ends of the oblong apertures tilting rearwardly so that bottom ends of the oblong apertures are closer to the end wall of the trap than the upper ends of the oblong apertures.

14. The mouse trap as set forth in claim 13, wherein the forwardly extending arm of the catch has a lateral projection on either side positioned rearwardly of the forward tip, said lateral projections extending generally perpendicularly to the planar body of the catch, said lateral projections being received within the oblong apertures formed in the trigger channel walls.

15. A mouse trap comprising:
   a housing having a floor and a body defining a housing enclosure, said body having a front end that is open and a rear end opposite said front end that is substantially closed by an end wall, said end wall having at least one aperture therein, said housing having an arched top portion;
   a door mounted to the housing adjacent the end wall and configured to fully close said substantially closed end when the door is closed;
   a trigger mechanism including a lever and a catch assembly having a catch operatively engaged with said lever, the catch assembly further including a setting cover having an inverted U-shaped portion with a generally flat top, two generally vertical side walls, and two downwardly directed arms extending from bottoms of the side walls that are curved to fit against the arched top portion of the housing, said catch being received between the side walls and secured to an inner surface of the top of the U-shaped portion;
   a guillotine member oriented substantially perpendicular to the housing floor and extending at least partly into said housing enclosure, said guillotine member configured to engage with said catch when the trap is set, engagement of said guillotine member with said catch holding the guillotine member in a raised position above the floor; and
   a spring operatively coupled between the housing and the guillotine member, said spring biasing said guillotine member to move rapidly to a lowered position adjacent the floor when the guillotine member becomes disengaged from said catch through movement of the lever by a rodent inside the housing enclosure.

* * * * *